(12) United States Patent
Berry et al.

(10) Patent No.: US 8,688,609 B2
(45) Date of Patent: Apr. 1, 2014

(54) TRANSFORMING A LIST OF PURCHASE TYPES BASED ON A CONFIGURABLE RULE

(75) Inventors: Charles Franklin Berry, Apalachin, NY (US); Glenn C. Godoy, Endwell, NY (US); Amy Jeanne Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 13/472,700

(22) Filed: May 16, 2012

(65) Prior Publication Data

US 2012/0233016 A1 Sep. 13, 2012

Related U.S. Application Data

(63) Continuation of application No. 12/164,243, filed on Jun. 30, 2008, now Pat. No. 8,204,841.

(51) Int. Cl.
*G06F 17/00* (2006.01)
*G06F 7/00* (2006.01)
*G06Q 10/00* (2012.01)
*G06N 99/00* (2010.01)

(52) U.S. Cl.
CPC .................................. *G06N 99/005* (2013.01)
USPC ................. 706/45; 706/47; 707/694; 705/1.1

(58) Field of Classification Search
None
See application file for complete search history.

(56) References Cited

U.S. PATENT DOCUMENTS

| | | | |
|---|---|---|---|
| 6,128,602 A | 10/2000 | Northington et al. | |
| 7,197,480 B1 | 3/2007 | Chollon et al. | |
| 7,356,496 B2 | 4/2008 | Kane et al. | |
| 2003/0120528 A1 | 6/2003 | Kruk et al. | |
| 2008/0077418 A1 | 3/2008 | Coleman et al. | |
| 2008/0077860 A1 | 3/2008 | Godoy et al. | |
| 2008/0147584 A1 | 6/2008 | Buss | |
| 2009/0327194 A1 | 12/2009 | Berry et al. | |

OTHER PUBLICATIONS

Notice of Allowance (Mail Date Feb. 15, 2012) for U.S. Appl. No. 12/164,243, filed Jun. 30, 2008.

*Primary Examiner* — Alan Chen
(74) *Attorney, Agent, or Firm* — Schmeiser, Olsen & Watts; John R. Pivnichny

(57) ABSTRACT

An approach for transforming a starting list of purchase types into a selection list of valid purchase types by employing a configurable rule is presented. A unit price and commodity code are received for an item whose purchase is being charged to an account. Based on a category of the item, a starting list including purchase types is generated. Each purchase type specifies a corresponding accounting function. A rule set is identified in a table that associates the rule set with purchase type(s) specifying corresponding accounting functions. Identifying the rule set includes determining that the purchase type(s) are in a maximal subset of the purchase types included in the starting list. Based on the rule set and the unit price, a rule is identified in another table. The rule is applied to generate a selection list comprising a proper subset of the starting list.

20 Claims, 14 Drawing Sheets

| RULE SET ID 502 | CORPORATION ID 504 | PURCHASE TYPE CODE 506 | CAPITAL RULE ID 508 | USAGE CODE 510 | DEFAULT CODE 512 |
|---|---|---|---|---|---|
| WIP_DIR_EXP | IBM | WIP | AHAL | INCLUDE | |
| WIP_DIR_EXP | IBM | DIR | AHAL | INCLUDE | DFLT |
| WIP_DIR_EXP | IBM | EXP | AHAL | EXCLUDE | |
| WIP_DIR_EXP | IBM | LV | AHAL | INCLUDE | |
| WIP_DIR_EXP | IBM | WIP | AHBL | INCLUDE | DFLT |
| WIP_DIR_EXP | IBM | DIR | AHBL | INCLUDE | |
| WIP_DIR_EXP | IBM | EXP | BHAL | INCLUDE | |
| WIP_DIR_EXP | IBM | WIP | BHAL | EXCLUDE | |
| WIP_DIR_EXP | IBM | DIR | BHAL | EXCLUDE | |
| WIP_DIR_EXP | IBM | EXP | BHAL | INCLUDE | DFLT |
| WIP_DIR_EXP | IBM | LV | BHAL | | |
| . . . | . . . | . . . | . . . | . . . | . . . |
| WIP_EXP | IBM | WIP | AHAL | INCLUDE | DFLT |
| WIP_EXP | IBM | EXP | AHAL | EXCLUDE | |
| WIP_EXP | IBM | LV | AHAL | INCLUDE | |
| . . . | . . . | . . . | . . . | . . . | . . . |

TRANSFORMING A LIST OF PURCHASE TYPES BASED ON A CONFIGURABLE RULE

This application is a continuation application claiming priority to Ser. No. 12/164,243, filed Jun. 30, 2008.

FIELD OF THE INVENTION

The present invention relates to a data processing technique for transforming a list of values based on a configurable rule, and more particularly to a technique for transforming a starting list of purchase types into a selection list of valid purchase types by employing a configurable rule.

BACKGROUND OF THE INVENTION

An introduction of new purchase types to procurement systems is conventionally handled by expensive, time-consuming, inflexible, and difficult-to-maintain coding. The complex set of rules associated with a category of purchase (e.g., capital purchase) that includes a new purchase type is also addressed by coding having the aforementioned drawbacks. Thus, there exists a need to overcome at least one of the preceding deficiencies and limitations of the related art.

SUMMARY OF THE INVENTION

In first embodiments, the present invention provides a computer-implemented method of transforming a starting list into a validated selection list by employing a configurable rule. A first computing system receives one or more parameters of an item being processed by a software application executing on the first computing system. The first computing system generates a starting list comprising a set of elements. The generation of the starting list is based on a pre-defined category of the item. Each element of the starting list specifies a corresponding function of a set of functions performed by the software application. The first computing system identifies a rule set of a group of rule sets stored in a rule set database table. The rule set database table associates the rule set with one or more values that specify one or more corresponding functions of the set of functions performed by the software application. The identification of the rule set comprises determining that the one or more values comprise a maximal subset of the set of elements included in the starting list. The first computing system identifies a rule stored in a rule database table. The identification of the rule is based on the rule set and on the one or more parameters of the item. An application of the identified rule by the first computing system results in a selection list comprising a proper subset of the starting list. The selection list is displayed on a display device coupled to a second computing system. The second computing system is either the first computing system or a computing system other than the first computing system.

In second embodiments, the present invention provides a computer-implemented method of transforming a starting list of purchase types into a selection list of valid purchase types by employing a configurable rule. A software-based common accounting module (CAM) executing on a first computing system receives parameters of an item whose purchase is being charged to an account by an execution by CAM of an accounting function of a set of accounting functions. The parameters include a unit price of the item and a commodity code that identifies the item. The CAM generates a starting list comprising a set of purchase types. The generation of the starting list is based on a pre-defined category of the item. Each purchase type of the starting list specifies a corresponding accounting function of the set of accounting functions. After the generation of the starting list, the CAM identifies a rule set of a group of rule sets stored in a rule set database table. The rule set database table associates the rule set with one or more purchase types that specify one or more corresponding accounting functions of the set of accounting functions. The identification of the rule set comprises determining that the one or more purchase types comprises a maximal subset of the set of purchase types included in the starting list. After the identification of the rule set, the CAM identifies a rule stored in a rule database table. The identification of the rule is based on the rule set and based on the unit price. After the identification of the rule, the CAM applies the rule. The application of the rule results in a selection list comprising a proper subset of the starting list. After the application of the rule, the selection list is displayed on a display device coupled to a second computing system. The second computing system is either the first computing system or a computing system other than the first computing system.

Systems and computer program products corresponding to the above-summarized methods are also described herein.

BRIEF DESCRIPTION OF THE DRAWINGS

FIG. 5 is an exemplary rule table utilized in the process of FIG. 3, in accordance with embodiments of the present invention.

DETAILED DESCRIPTION OF THE INVENTION

Overview

A software-based calling application (i.e., sending application) running on a first computer sends parameters of an item (e.g., a commodity being purchased) to a software-based callee application (i.e., receiving application) running on a second computer. The callee application provides functionality (e.g., an accounting function) to process the item and the item's parameters. The invention disclosed herein is a technique for transforming a starting list of elements into a filtered selection list that includes elements that are validated by an application of a rule in a rule table. The rule is identified in response to identifying a rule set in a rule set trigger table, where values in the rule set match a maximal subset of starting list elements. The selection list resulting from the transformation of the starting list is displayed to a user for selection of one of the selection list elements. The user's selection is utilized by the callee application to complete the processing of the item.

If the processing of the callee application is later modified with a new element that is added to the starting list, the configuration provided by the rule table and rule set trigger table is updated with the new element without requiring a time-consuming and expensive update of programming code.

Configurable Rule-Based List Transformation System

Figure 1:
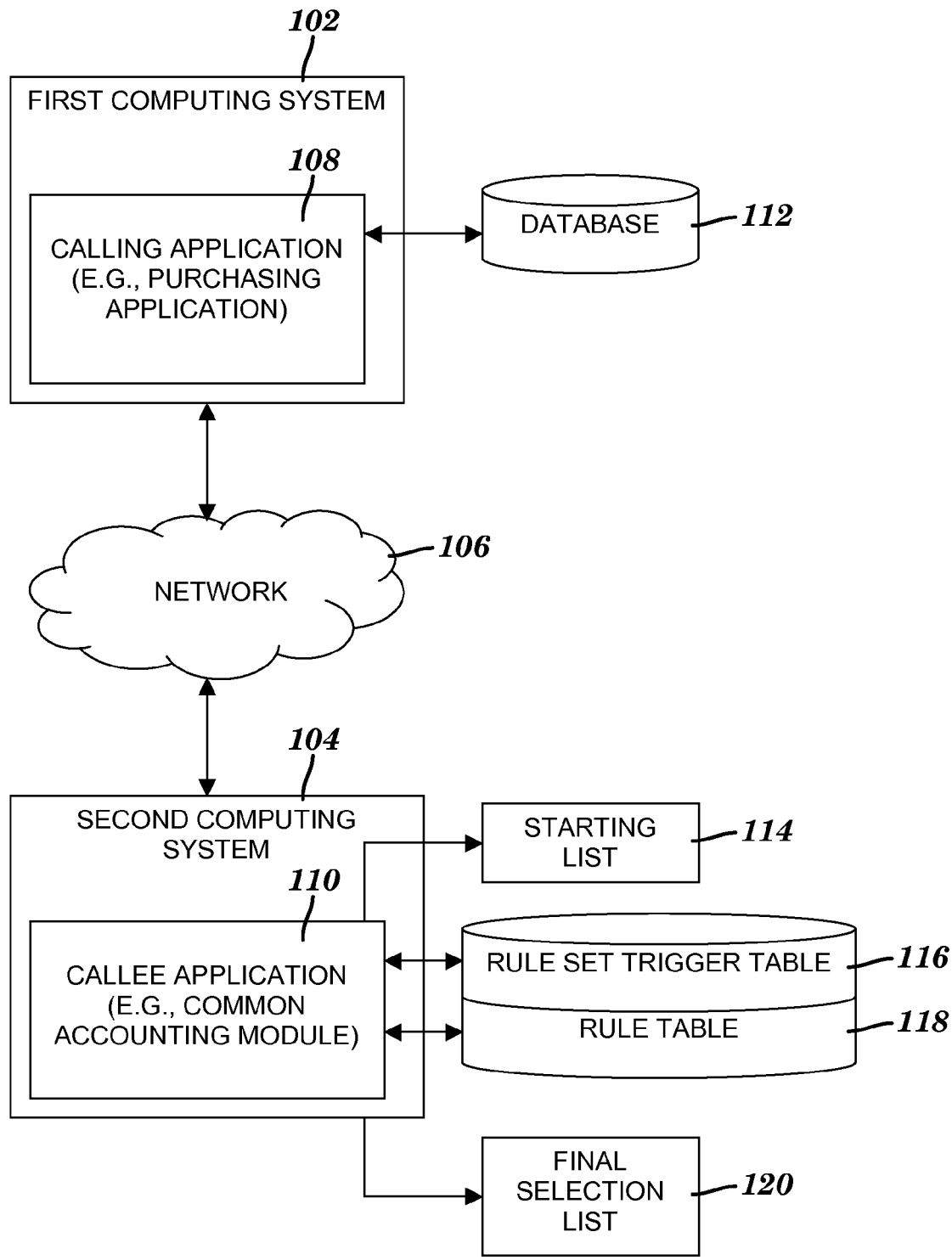
FIG. 1 is a block diagram of a system for transforming a starting list into a selection list by using a configurable rule in a rule set having a maximal subset of the starting list, in accordance with embodiments of the present invention.

FIG. 1 is a block diagram of a system for transforming a starting list into a selection list by using a configurable rule in a rule set having a maximal subset of the starting list, in accordance with embodiments of the present invention. System 100 may include a first computing system 102 and a second computing system 104 that share data via a network 106 (e.g., the Internet). First computing system 102 executes a calling application 108. Second computing system 104 executes a callee application 110. Calling application 108 requests a processing of data that requires a function of the callee application. For example, the calling application is a purchasing application that requests the creating, editing and/or validating of information required by an accounting function performed by the callee application.

A database 112 may be stored in a data repository coupled to first computing system 102 and may be accessible by calling application 108. Database 112 includes a set of data elements that are to be processed by callee application 110. For example, the data elements in database 112 may include parameters associated with an item (e.g., a commodity) for which a user is required to select a purchase type (a.k.a. purchasing type) to facilitate an accounting function applied to the item by callee application 110. In one example, the aforementioned parameters include a commodity code that identifies the item and a unit price of the item. Other parameters may include identifiers of a company that is purchasing the item and the country in which the company is located. Furthermore, the parameters may include a default identifier of a cost center related to the item and a flag that indicates whether the item is an internal/resale item.

A starting list 114 is generated by callee application 110. Starting list 114 is a working list of values that is processed by callee application 110. The processing by callee application 110 includes identifying a rule set included in a rule set trigger table 116 and applying a rule included in a rule table 118. Rule set trigger table 116 and rule table 118 are, for example, relational database tables. The processing by callee application 110 results in a transformation of the starting list into a final selection list 120. In one embodiment, final selection list 120 is displayed on a display device (not shown) coupled to second computing system 104. In another embodiment, final selection list 120 is displayed on a display device (not shown) coupled to a computing system other than second computing system 104.

For example, the starting list 114 is a list of purchase types and the processing performed by callee application 110 generates a final selection list 120 of purchase types by including one or more values from starting list 114 and/or filtering out one or more other values from starting list 114. The final selection list 120 includes only the purchase types that are appropriate per the rule selected from rule table 118.

As used herein, a rule (e.g., business rule) included in rule table 118 is defined as a requirement of a business entity and a rule set is defined as a set of rules.

In one embodiment, system 100 is implemented by an integrated web application environment in which data is shared between calling application 108 and callee application 110 via a web service.

In one embodiment, a plurality of calling applications (not shown) being executed on a plurality of computing systems (not shown) send data processing requests to callee application 110 via network 106.

Further details about the functionality of the components of system 100 are included in the discussion below relative to FIG. 2 and FIG. 3.

Configurable Rule-Based List Transformation Process

Figure 2:
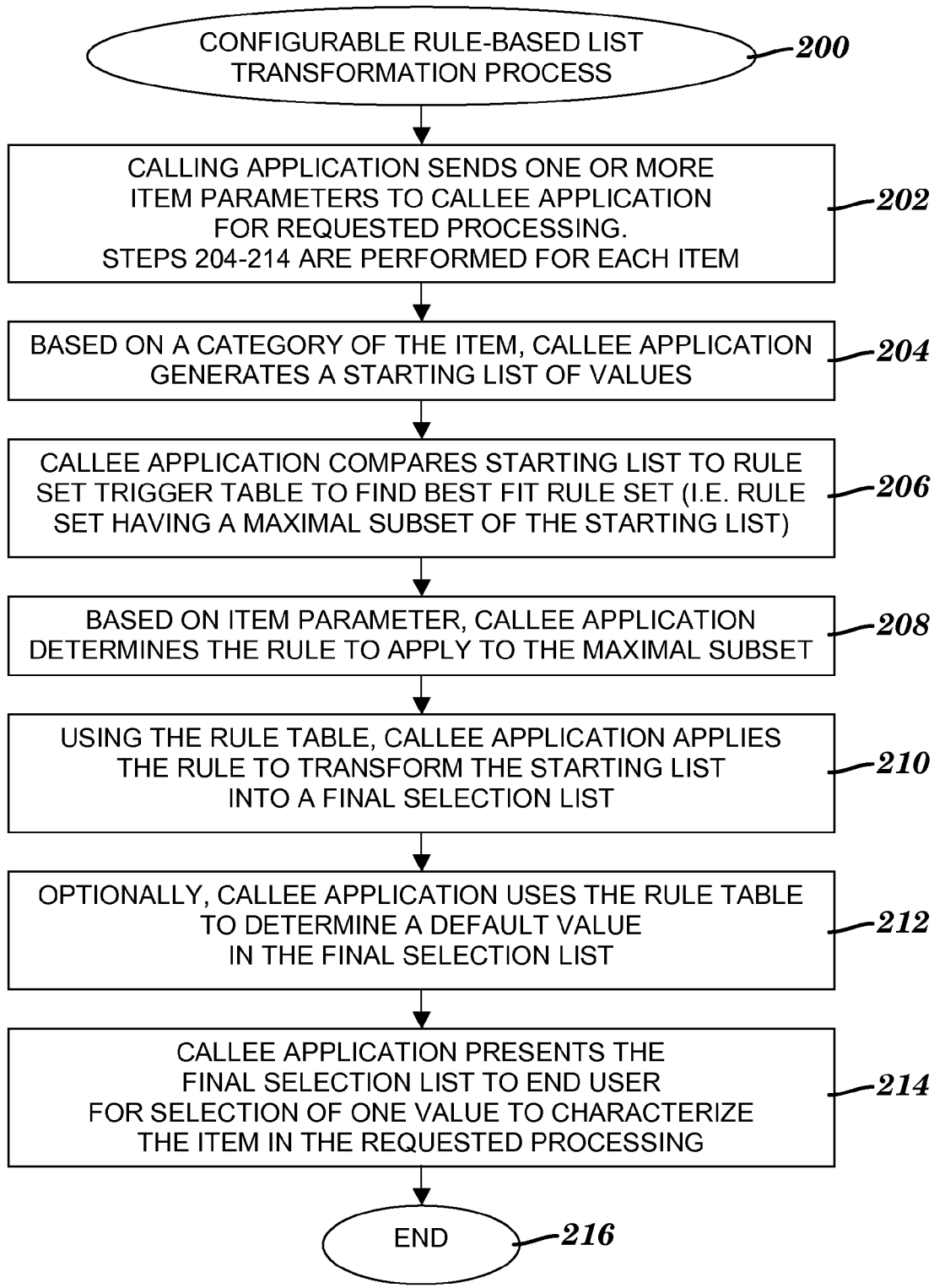
FIG. 2 is a flowchart of a process of transforming a starting list into a selection list by using a configurable rule in a rule set having a maximal subset of the starting list, where the process is implemented by the system of FIG. 1, in accordance with embodiments of the present invention.

FIG. 2 is a flowchart of a process of transforming a starting list into a selection list by using a configurable rule in a rule set having a maximal subset of the starting list, where the process is implemented by the system of FIG. 1, in accordance with embodiments of the present invention. The list transformation process starts at step 200. In step 202, calling application 108 (see FIG. 1) sends one or more items and one or more parameters (a.k.a. item parameters) of each item to callee application 110 (see FIG. 1). The items and parameters are sent in step 202 to be processed by callee application 110 (see FIG. 1) according to the calling application's request for processing. In one embodiment, before sending the items and item parameters in step 202, the items and item parameters are retrieved from data records in database 112 (see FIG. 1). Steps 204-214 are performed for each item of the one or more items sent in step 202.

In one embodiment, calling application 108 (see FIG. 1) requests that callee application 110 (see FIG. 1) perform an accounting function with one of the items and associated item parameter(s) sent in step 202. For example, during a procurement process, calling application 108 (see FIG. 1) sends a record of a commodity that is being purchased by an entity (e.g., a business entity that controls calling application 108 (see FIG. 1)). In the example of this paragraph, the record being sent includes parameters related to the commodity (e.g., a commodity code identifying the commodity and a unit price of the commodity).

In step 204, based on a category of the item, callee application 110 (see FIG. 1) generates a starting list of values. The starting list includes a set of values. A proper subset of the set of values of the starting list is to be included in a final selection list. Each value in the starting list specifies a corresponding function (e.g., accounting function) of a plurality of functions performed by callee application 110 (see FIG. 1).

In one embodiment, prior to step 204, callee application 110 (see FIG. 1) executes one or more predefined filtering methods to add to or subtract from a superset of values. For instance, one filtering method excludes values from the superset based on the type of document (e.g., shopping cart) sent from calling application 108 (see FIG. 1) to callee application 110 (see FIG. 1). The result of executing the predefined filtering methods is a final superset of values (e.g., a superset of purchase types). Based on a predefined rule, the category used in step 204 selects one or more values from the superset to generate the starting list in step 204.

Figure 4:
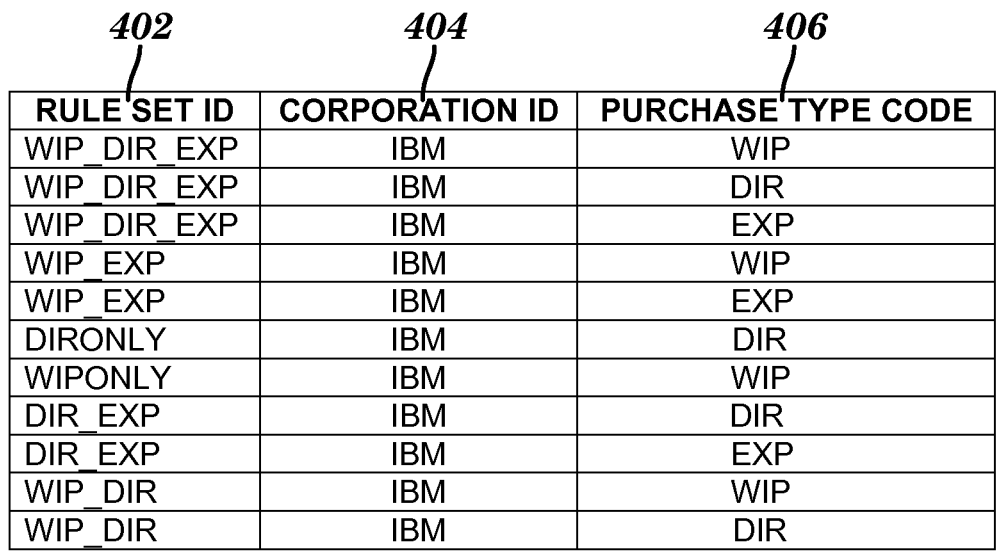
FIG. 4 is an exemplary rule set trigger table utilized in the process of FIG. 3, in accordance with embodiments of the present invention.

In step 206, callee application 110 (see FIG. 1) compares the values in the starting list to rule set trigger table 116 (see FIG. 1). The comparison in step 206 results in the callee application identifying (i.e., triggering) the best fit rule set of multiple rule sets included in rule set trigger table 116 (see FIG. 1). The best fit rule set is the rule set that includes a maximal subset of the starting list. An example of rule set trigger table 116 (see FIG. 1) is shown in FIG. 4.

For example, the item is in category X and a database table associates category X with a starting list that includes the values [A, B, C, D, E], where each value in the starting list indicates a purchase type. According to pre-defined rules stored in a database, pre-defined subsets of [A, B], [A, B, C], [A, C], and [A, B, C, D] are valid subsets of the starting list. Rule set trigger table 116 (see FIG. 1) includes multiple rule set records (e.g., rows in the rule set trigger table), where each rule set corresponds to one of the pre-defined valid subsets of the starting list. Each rule set in rule set trigger table 116 (see FIG. 1) corresponds to one or more rows in table 116 (see FIG. 1), and each row in table 116 (see FIG. 1) corresponds to exactly one rule set.

In the example of the preceding paragraph, rule set trigger table 116 (see FIG. 1) associates a first rule set identifier (e.g., ABCDRuleSet) with the purchase types in subset [A, B, C, D] in four rows of the rule set trigger table. The four rows include the elements A, B, C and D, one element per row. Similarly, rule set trigger table 116 (see FIG. 1) associates a second rule set identifier (e.g., ABCRuleSet) with the purchase types in subset [A, B, C] in 3 rows of the rule set trigger table. The 3 rows corresponding to the second rule identifier include the elements A, B, and C, one element per row. Furthermore, the rule set trigger table 116 (see FIG. 1) associates a third rule set identifier (e.g., ABRuleSet) with the purchase types in subset [A, B] in 2 rows of the rule set trigger table. The 2 rows corresponding to the third rule set identifier include the elements A and B, one element per row. Finally, the rule set trigger table 116 (see FIG. 1) associates a fourth rule set identifier (e.g., ACRuleSet) with the purchase types in subset [A, C] in 2 rows of the rule set trigger table. The 2 rows corresponding to the fourth rule set identifier include the elements A and C, one element per row.

Step 206 identifies [A, B, C, D] as the maximal subset of the starting list. That is, of the aforementioned pre-defined valid subsets, subset [A, B, C, D] is the valid subset that includes the most elements that match elements in the starting list. In this example, [A, B, C, D] has 4 elements (i.e., matching elements) that match elements in the starting list of [A, B, C, D, E], while subset [A, B, C] has only 3 matching elements and subsets [A, B] and [A, C] each have only 2 matching elements.

Since step 206 identified [A, B, C, D] as the maximal subset and the first rule set identifier is associated with the maximal subset, step 206 also identifies the first rule set as the best fit rule set.

In step 208, based on one or more parameters of the item (i.e., parameter(s) sent to the callee application in step 202), callee application 110 (see FIG. 1) determines a rule stored in rule table 118 (see FIG. 1) to apply to generate final selection list 120 (see FIG. 1). Rule table 118 (see FIG. 1) associates one or more rules with each rule set identifier used in rule set trigger table 116 (see FIG. 1). Each rule is identified in the rule table 118 (see FIG. 1) by a rule identifier. One rule identifier may be included in multiple rows of rule table 118 (see FIG. 1), where each of the multiple rows is identified by the same rule set identifier.

In one embodiment, the determination of the rule in step 208 is based on an analysis of the one or more parameters that were sent in step 202. For example, if one parameter is the unit price of a commodity whose commodity code is also sent in step 202, the unit price is compared to multiple threshold level values (a.k.a. clips, clip values or clip levels). In the example of this paragraph, the relationship between the values of the unit price and the clips identifies a particular rule in rule table 118 (see FIG. 1). For instance, if the unit price is above a first clip and below a second clip, and if the rule naming convention in this example designates "above" as "A", "below" as "B", the first clip as "H", and the second clip as "L", then a Rule AHBL (i.e., above the first clip and below the second clip) in rule table 118 (see FIG. 1) is identified in step 208.

In step 210, callee application 110 (see FIG. 1) applies the rule determined in step 208 to generate final selection list 120 (see FIG. 1). The application of the rule in step 210 utilizes one or more rows in rule table 118 (see FIG. 1) that correspond to the rule determined in step 208 and the best fit rule set identified in step 206. Each row of rule table 118 (see FIG. 1) also includes a value in a value-to-be-managed column (e.g., a purchase type code column) that matches a value in the starting list 114 (see FIG. 1) and instructions (i.e., fine tuning instructions) to manage the corresponding value in the value-to-be-managed column to generate final selection list 120 (see FIG. 1).

It should be noted that one or more values in starting list 114 (see FIG. 1) may not be included in the value-to-be-managed column in the one or more rows in rule table 118 (see FIG. 1) that are utilized in step 210. Such values that are not included in the value-to-be-managed column are unaffected by the rule being applied in step 210. For the aforementioned example in which the starting list of purchase types is [A, B, C, D, E], the purchase type E is not included in the value-to-be-managed column in rule table 118 (see FIG. 1) and purchase type E is unaffected by the rule applied in step 210.

Step 210 also includes executing the fine tuning instructions included in each row of rule table 118 that includes the best fit rule set identifier identified in step 206 and the rule determined in step 208. In one embodiment, executing the fine tuning instructions builds the final selection list 120 (see FIG. 1) by including in (i.e., inserting into) the final selection list one or more values from the starting list 114 (see FIG. 1) and/or by excluding from the final selection list one or more other values from the starting list.

Any value in the starting list 114 (see FIG. 1) that is unaffected by the rule applied in step 210 is also inserted in the final selection list 120 (see FIG. 1) being generated in step 210. That is, any value of the starting list that is not included in the value-to-be-managed column in the one or more rows of rule table 118 (see FIG. 1) utilized in step 210 is inserted in the final selection list.

Thus, in one embodiment, the final selection list 120 (see FIG. 1) is a proper subset of the starting list 114 (see FIG. 1). In this case, the final selection list generated in step 210 includes a first set of one or more values inserted by the execution of the aforementioned fine tuning instructions, does not include a second set of one or more values excluded by the execution of the fine tuning instructions, and further includes any other value that is in the starting list 114 (see FIG. 1) but is not in the first set of one or more values and is not in the second set of one or more values (i.e., further includes one or more values that are unaffected by the rule applied in step 210).

For example, the rule table 118 (see FIG. 1) includes a usage code column that may include the values of INCLUDE or EXCLUDE. In the example of this paragraph, the rule table 118 (see FIG. 1) also includes a column (i.e., purchase type column) that includes purchase types. In this example, for each row of rule table 118 (see FIG. 1) that includes the identifier of the best fit rule set identified in step 206 and the rule determined in step 208, callee application 110 (see FIG. 1) analyzes the value that is in the usage code column of that row. In response to callee application 110 identifying INCLUDE in the usage code column of rule table 118 (see FIG. 1), the callee application adds to the final selection list 120 (see FIG. 1) the corresponding purchase type included in the purchase type column. Furthermore, in response to callee application 110 (see FIG. 1) identifying EXCLUDE in the usage code column of rule table 118 (see FIG. 1), the callee application excludes from the final selection list 120 (see FIG. 1) the corresponding purchase type included in the purchase type column. Finally, any value in the starting list that is not included in the rows being analyzed in this example is also included in the final selection list 120 (see FIG. 1).

In optional step 212, callee application 110 (see FIG. 1) uses rule table 118 (see FIG. 1) to determine a default value in the final selection list 120 (see FIG. 1). In one embodiment, rule table 118 (see FIG. 1) includes a default code column that indicates whether or not the purchase type in the purchase type column is a default value in the final selection list. For example, in response to identifying a value of DFLT in the default code column corresponding to an LV value in the purchase type column, callee application 110 (see FIG. 1) sets LV (i.e., low value asset) as a default value to be displayed in the final selection list 120 (see FIG. 1).

In step 214, callee application 110 (see FIG. 1) presents the final selection list 120 (see FIG. 1) to an end user. In one embodiment, callee application 110 (see FIG. 1) displays the final selection list 120 (see FIG. 1) on a display device (e.g., display monitor) coupled to second computing system 104. In one embodiment, callee application 110 (see FIG. 1) displays the final selection list 120 (see FIG. 1) to an end user of callee application 110 (see FIG. 1) in a drop down list, a list box or another Graphical User Interface (GUI) element that includes selectable elements of a list. In another embodiment in which optional step 212 is performed, the display device coupled to second computing system 104 displays final selection list 120 (see FIG. 1) with the default value determined in step 212 indicated as the default value in a drop down list, a list box or another GUI element that includes selectable elements of a list. In an alternate embodiment, step 214 includes displaying final selection list 120 (see FIG. 1) on a display device coupled to a computing system other than second computing system 104 (see FIG. 1).

After the presentation of the final selection list 120 (see FIG. 1) to the end user in step 214, the end user selects one of the values included in the final selection list. The selection of one of the values in the final selection list 120 (see FIG. 1) may include choosing to retain the default value determined in step 212 or changing the default value to another one of the values in final selection list 120 (see FIG. 1). The callee application 110 (see FIG. 1) stores the selected value in a data repository (not shown) (e.g., a database table). The list transformation process ends at step 214.

For example, the final selection list is a list of valid purchase types for a purchase of a commodity that is characterized as a capital purchase. In the example of this paragraph, step 214 includes displaying the list of valid purchase types as a drop down list on a display monitor viewed by an end user of a common accounting module, which is an example of the callee application 110 (see FIG. 1). The end user selects a valid purchase type (e.g., direct capital) from the drop down list to characterize the accounting of the commodity that is being purchased. The common accounting module then uses the selected valid purchase type to perform an accounting function to process the commodity.

Transforming a List of Purchase Types

Figure 3:
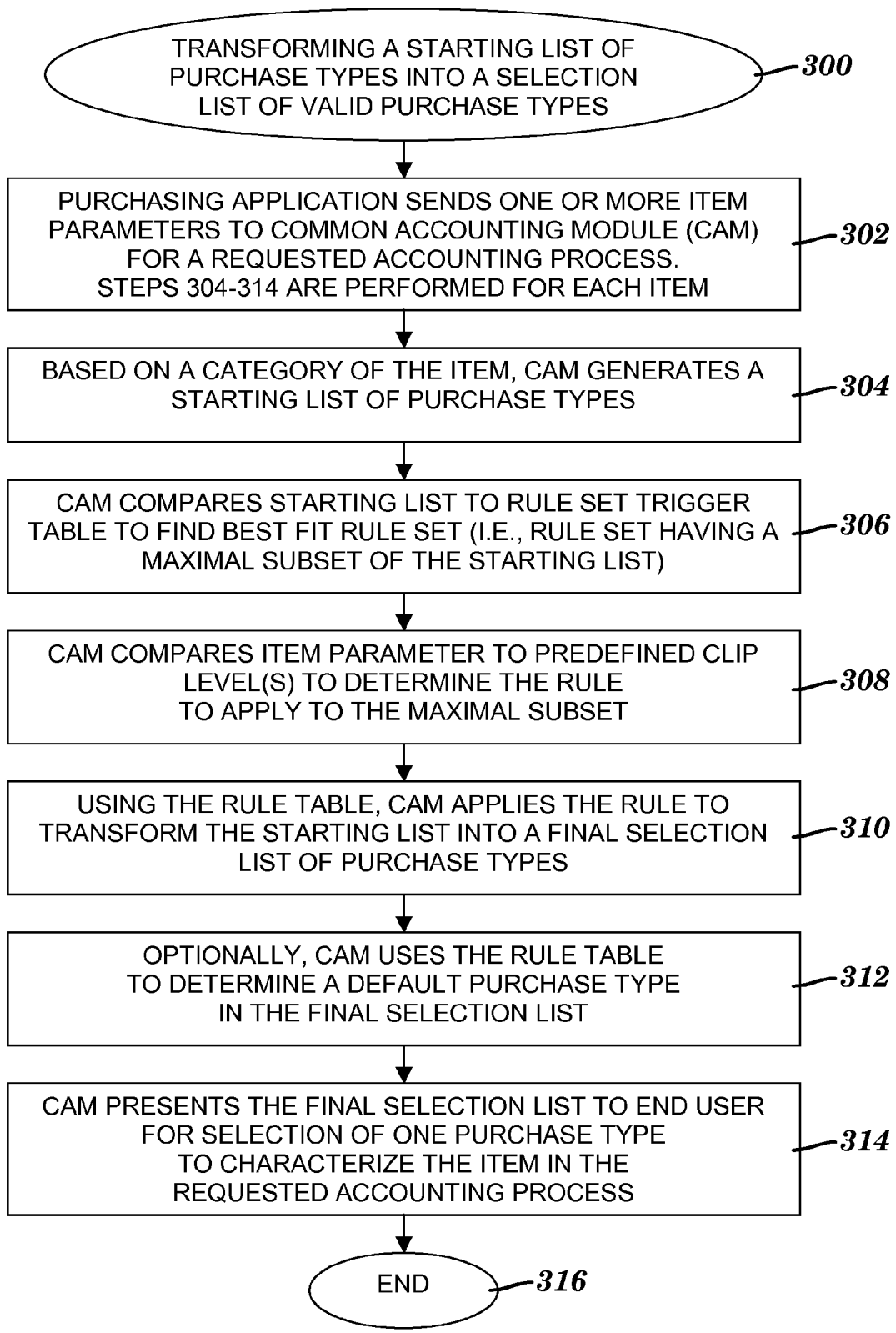
FIG. 3 is a flowchart of an example of the process of FIG. 2 that includes transforming a starting list of purchase types into a selection list of valid purchase types, in accordance with embodiments of the present invention.

FIG. 3 is a flowchart of an example of the process of FIG. 2 that includes transforming a starting list of purchase types into a selection list of valid purchase types, in accordance with embodiments of the present invention. In the example of this section, a purchasing application is an example of calling application 108 (see FIG. 1), a common accounting module (CAM) is an example of callee application 110 (see FIG. 1) and the superset of purchase types includes EXP, RES, INV, BAL, WIP, DIR and LV, which indicate Expense, Resale, Inventory, Balance Sheet, Work-in-Process (WIP) capital, direct capital, and low value asset. According to pre-determined business logic, the only purchase types relevant to determining the applicability of a capital purchase are WIP capital, direct capital, and expense. The rule set trigger table 116 (see FIG. 1) in this example is a capital rule set trigger table 400 (see FIG. 4) that includes identifiers of rule sets associated with pre-defined combinations of WIP capital, direct capital and expense, where the pre-defined combinations are relevant to capital purchases. For instance, the WIP_DIR_EXP rule set ID in column 402 (see FIG. 4) indicates the combination of WIP capital, direct capital and expense and the DIR_EXP rule set ID indicates the combination of direct capital and expense.

The exemplary process of transforming the starting list 114 (see FIG. 1) of purchase types begins at step 300. In step 302, the purchasing application sends to the CAM one or more parameters (i.e., item parameters) of an item being purchased. Step 302 may include sending parameter(s) of multiple items. The item parameter(s) sent in step 302 are needed by the CAM to perform accounting functions that process the item. The item is a commodity being purchased and the one or more item parameters associated with the commodity include a commodity code that identifies the commodity and a unit price of the commodity. In the example of this section, step 302 includes sending a unit price of $1000.00. Steps 304-314 described below are performed for each of the items sent in step 302.

In step 304, based on a pre-defined category of the commodity whose parameter(s) are sent in step 302, the CAM generates the starting list 114 (see FIG. 1) of purchase types. In the example of this section, the commodity code sent in step 302 indicates that a pre-defined category of the commodity is "office supplies." Callee application 110 (see FIG. 1) determines that any commodity categorized as office supplies may be charged against expense, balance sheet, WIP capital, or direct capital accounts, which are indicated in the rule set IDs in table 400 (see FIG. 4) as EXP, BAL, WIP and DIR, respectively. Thus, the starting list generated in step 304 is the list of purchase types: [EXP, BAL, WIP, DIR].

In step 306, the CAM compares the starting list generated in step 304 to rule set trigger table 400 (see FIG. 4), which includes a rule set ID column 402 (see FIG. 4), corporation ID column 404 (see FIG. 4) and a purchase type code column 406 (see FIG. 4). The comparison in step 306 identifies, for each distinct rule set ID in column 402, the purchase type codes in column 406 (see FIG. 4) that match the values in starting list 114 (see FIG. 1). The CAM identifies the rule set in the capital rule trigger table 116 (see FIG. 1) that includes the purchase type codes that have the greatest number of matches to starting list 114 (see FIG. 1). The WIP_DIR_EXP rule set is identified by the CAM as having 3 purchase type codes (i.e., WIP, DIR and EXP in column 406 (see FIG. 4) in the first three data rows of table 400 of FIG. 4) that match elements of the starting list of [EXP, BAL, WIP, DIR]. That is, WIP in the first data row of table 400 (see FIG. 4) matches WIP in the starting list, DIR in the second data row of table 400 (see FIG. 4) matches DIR in the starting list (as indicated above), and EXP in the third data row of table 400 (see FIG. 4) matches EXP in the starting list.

The CAM determines that the other rule sets in table 400 (see FIG. 4) have fewer than 3 purchase type matches to the starting list. Thus, the WIP_DIR_EXP rule set has the greatest number of the aforementioned matches (i.e., the WIP_DIR_EXP rule set includes the maximal subset of the starting list). Since WIP_DIR_EXP has the maximal subset of the starting list, the CAM identifies WIP_DIR_EXP as the best fit rule set in step 306.

In step 308, the CAM determines the rule to apply to transform the starting list 114 (see FIG. 1) into the final selection list 120 (see FIG. 1) of valid purchase types. In the example of this section, there are two clip levels. The first clip level is a high value clip level (HV clip) and the second clip level is a low value clip level (LV clip). Certain purchases of a commodity having a unit price above the HV clip must be accounted for as a direct capital purchase. An expense commodity whose unit price is over the LV clip must be accounted for as a low value asset. The rule determined in step 308 is identified by the CAM based on the relationship between the unit price of the commodity and the HV clip and the LV clip. In the example of this section, the CAM includes logic to detect 6 different relationships that are based on the following conditions: (1) unit price is above (i.e., greater than) the HV clip and above the LV clip, (2) unit price is below (i.e., less than) the HV clip and above the LV clip, (3) unit price is above the HV clip and below the LV clip, (4) unit price is below the HV clip and below the LV clip, (5) unit price is above the HV clip and the LV clip is not set, and (6) unit price is below the HV clip and the LV clip is not set.

Relationships (1) through (6) described above are indicated in rule table 500 (see FIG. 5) as capital rule ID AHAL, BHAL, AHBL, BHBL, AHNL, and BHNL, respectively (see, e.g., column 508 of FIG. 5). In the example of this section, the LV clip is $200.00 and the HV clip is $5000.00. The CAM determines that the unit price of $1000.00 is below the HV clip and above the LV clip, which corresponds to the BHAL capital rule ID. Thus, in step 308, the CAM determines that BHAL is the capital rule to apply to transform the starting list 114 (see FIG. 1) into the final selection list 120 (see FIG. 1).

Other embodiments include variations of one or more of relationships (1)-(6) so that the condition being satisfied for a particular relationship may include "less than or equal to" instead of "less than" (or "below") and/or may include "greater than or equal to" instead of "greater than" (or "above"). For example, a variation of the BHAL relationship may be based on the condition: the unit price is less than or equal to the HV clip and the unit price is greater than or equal to the LV clip.

In step 310, the CAM utilizes rule table 500 (see FIG. 5) to apply the BHAL rule determined in step 308 to generate the final selection list 120 (see FIG. 1) by including and/or excluding values in the starting list 114 (see FIG. 1). Table 500 of FIG. 5 includes columns 502, 504, 506, 508, 510 and 512, which include rule set IDs, corporation IDs, purchase type codes, capital rule IDs, usage codes and default codes, respectively. For each row of table 500 (see FIG. 5) that includes WIP_DIR_EXP as the rule set ID (i.e., the rule set identified in step 306) and BHAL as the capital rule ID (i.e., the rule determined in step 308), the CAM checks the usage code and default code. That is, the CAM checks the usage code and the default code in the 8th-11th data rows of rule table 500 (see FIG. 5).

In the 8th data row of rule table 500 (see FIG. 5), the usage code is INCLUDE, which instructs the CAM to include the purchase type of WIP in the final selection list 120 (see FIG. 1). The purchase type of WIP is included because WIP is the entry in the purchase type code column (i.e., column 506 in FIG. 5) in the 8th data row of the rule table 500 (see FIG. 5).

In the 9th data row of rule table 500 (see FIG. 5), the usage code is EXCLUDE, which instructs the CAM to exclude direct capital from the final selection list 120 (see FIG. 1). The DIR entry in the purchase type column (i.e., column 506 in FIG. 5) of the 9th data row of the rule table indicates a direct capital purchase type. The exclusion of direct capital is based on the unit price being below the HV clip and indicates that the commodity is not to be charged as a direct capital purchase type.

In the 10th data row of rule table 500 (see FIG. 5), the usage code is EXCLUDE, which instructs the CAM to exclude the purchase type of expense from the final selection list 120 (see FIG. 1) (see the corresponding EXP entry in column 506 of the 10th data row of table 500 in FIG. 5).

In the 11th data row of rule table 500 (see FIG. 5), the usage code is INCLUDE, which instructs the CAM to include the purchase type of LV (i.e., low value asset; see the corresponding LV entry in column 506 of the 11th data row of table 500 in FIG. 5) in the final selection list 120 (see FIG. 1). It should be noted that the rule being applied in step 310 may add a purchase type (e.g., LV) that was not included in the maximal subset identified in step 306.

In the example of this section, the unit price being greater than the LV clip means that the commodity cannot be charged as an expense, but may be charged as a low value asset purchase type. Thus, EXP is excluded from final selection list 120 (see FIG. 1), as indicated by the EXCLUDE usage code in the 10th data row of table 500 (see FIG. 5), and LV is included in the final selection list, as indicated by the INCLUDE usage code in the 11th data row of table 500 (see FIG. 5).

In response to the CAM executing the instructions in the usage code column of rule table 500 (see FIG. 5), the final selection list includes WIP and LV and does not include DIR and EXP. The CAM also inserts into the selection list includes inserting any purchase types that are included in the starting list, but were unaffected by the rule applied in step 310. In the example in this section, the balance sheet purchase type (i.e., BAL) was unaffected by the BHAL rule applied in step 310. That is, BAL was not included in the entries in purchase type code column 506 (see FIG. 5) that are included in the rows (i.e., the 8th-11th data rows) of rule table 500 (see FIG. 5) that corresponded to the rule set ID identified in step 306 and the rule identified in step 308 (i.e., the rows of the rule table that include WIP_DIR_EXP in column 502 (see FIG. 5) and BHAL in column 508 (see FIG. 5)) Thus, the final selection list 120 (see FIG. 1) includes the purchase types indicated by BAL, WIP, and LV.

In step 312, the CAM uses rule table 118 (see FIG. 1) to determine a default purchase type in the final selection list 120 (see FIG. 1). Since the CAM identifies a DFLT entry in the default code column (i.e., column 512 in FIG. 5) of the 11th data row of table 500 of FIG. 5, the CAM sets the corresponding LV (i.e., low value asset) purchase type (see column 506 in the 11th data row of table 500 in FIG. 5) as the default purchase type in the final selection list of purchase types indicated by BAL, WIP, and LV.

In step 314, the final selection list of purchase types indicated by BAL, WIP and LV is displayed to an end user of the purchasing application. Since LV is the default value, "low value asset" (which is indicated by LV) is pre-selected for the end user as a preferred choice in the final selection list 120 (see FIG. 1). The end user then selects one of the purchase types indicated by BAL, WIP or LV. Following the end user's selection of the purchase type, CAM charges the office supply item being purchased to an account corresponding to the end user's selection.

In one embodiment, a new purchase type is introduced and is recognized by the CAM as a new category of a capital purchase. In this case, the starting list 114 (see FIG. 1) changes to a new starting list that includes the new purchase type. Furthermore, the rule set trigger table 116 (see FIG. 1) is updated to add one or more new rule set IDs that correspond to the new purchase type. Still further, the rule table 118 (see FIG. 1) is updated to add fine tuning instructions for rules and purchase types that are associated with the one or more new rule sets. In the embodiment described in this paragraph, the process of FIG. 3 remains the same. Thus, no program coding changes are required. The aforementioned changes to the configuration provided by the rule set trigger table and the rule table are sufficient to address the addition of the new purchase type and continue to generate the final selection list 120 (see FIG. 1) that includes valid purchase types.

FIGS. 6A-6H depict a flowchart of an exemplary business process whose requirements are satisfied by the process of FIG. 3, in accordance with embodiments of the present invention. The exemplary business process begins at step 600 of FIG. 6A. For the remainder of the description of FIGS. 6A-6H, the exemplary business process is referred to simply as "the process." In step 602, the CAM receives item parameters from a purchasing application, where the item parameters describe an item being purchased. The item parameters received in step 602 include identifiers of the company purchasing the item and the country in which the company is located, a commodity code identifying the item, a unit price of the item, a default cost center associated with the item, an identifier of the purchasing application, and an indicator of an internal/resale transaction.

Inquiry step 604 asks whether there are multiple purchase types or no purchase types with associated General Ledger accounts (GLs) configured for the country and commodity code received in step 602. If the response to the inquiry in step 604 is Yes, then the process continues with step 620 of FIG. 6B; otherwise, the process continues with step 606.

Inquiry step 606 asks whether the item is eligible to be charged to WIP, direct capital, and expense accounts. If the response to the inquiry in step 606 is Yes, then the process continues with step 634 of FIG. 6C; otherwise the process continues with step 608.

Inquiry step 608 asks whether the item is eligible to be charged to WIP and expense accounts. If the response to the inquiry in step 608 is Yes, then the process continues with step 646 of FIG. 6D; otherwise the process continues with process 610 that includes steps (not shown) for charging the item to an expense, resale, balance sheet or inventory account.

Figure 6A:
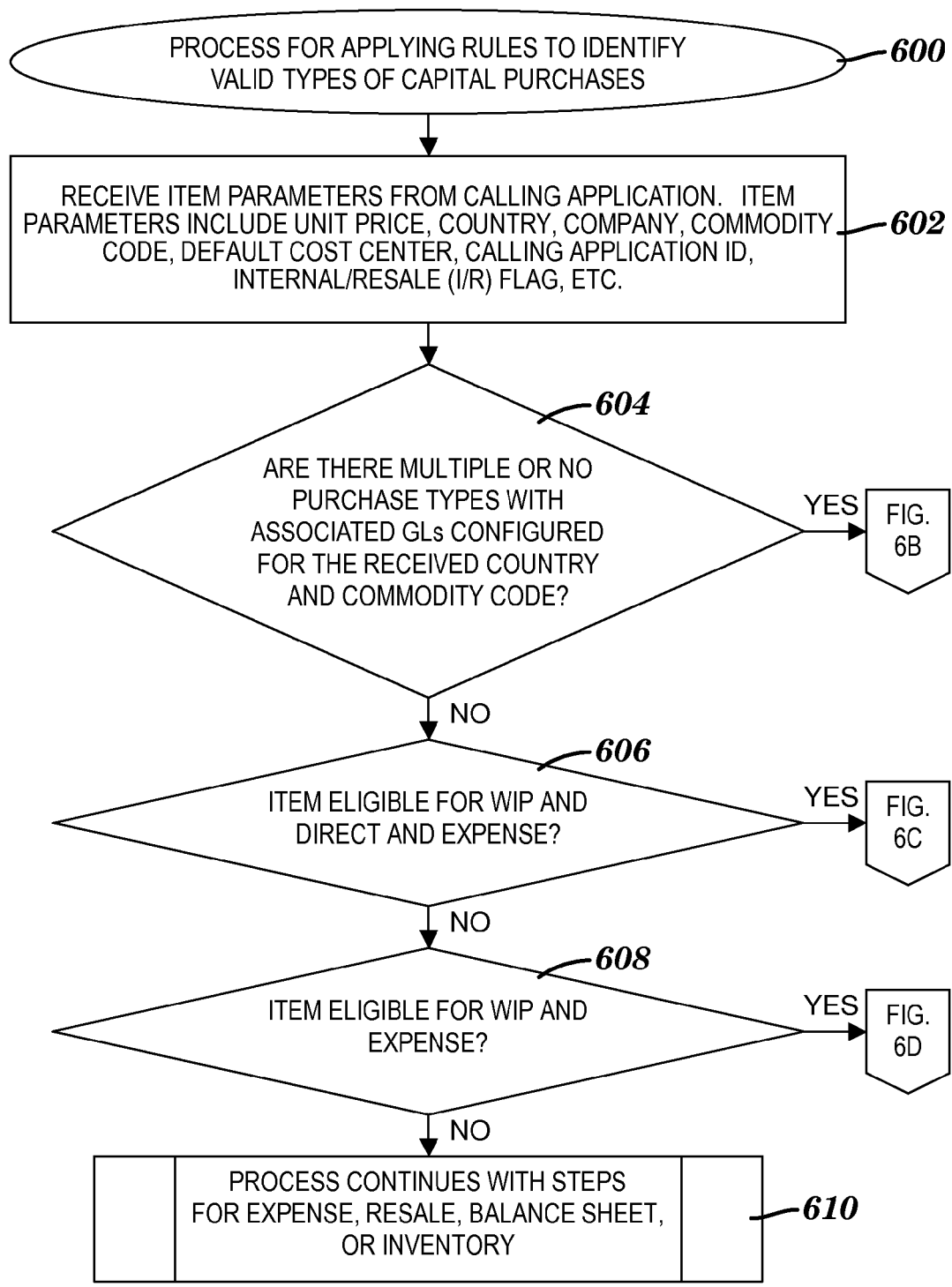
FIGS. 6A-6H depict a flowchart of an exemplary business process whose requirements are satisfied by the process of FIG. 3, in accordance with embodiments of the present invention.
Figure 6B:
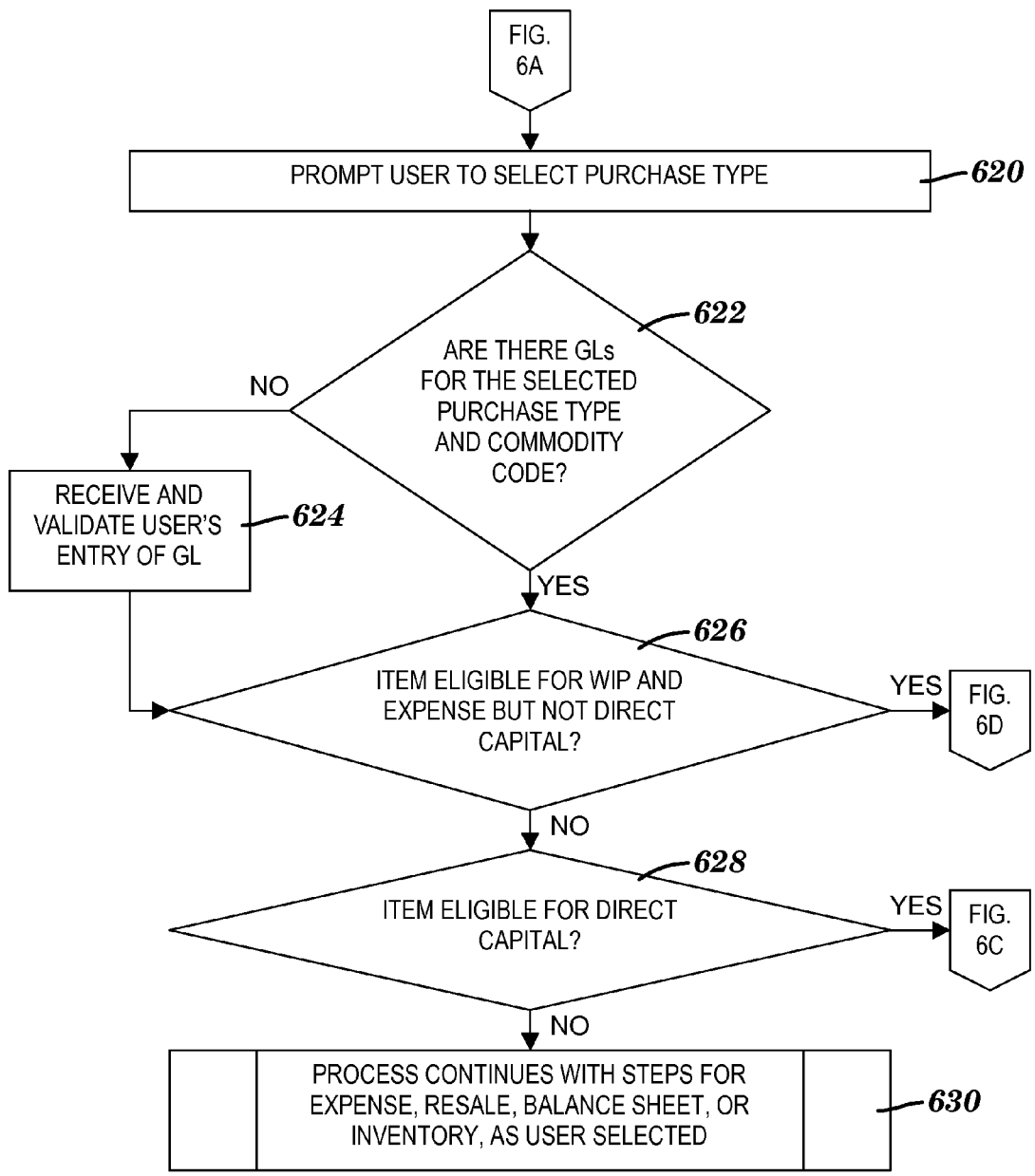

In step 620 of FIG. 6B, the CAM prompts a user of second computing system 104 (see FIG. 1) to select a purchase type. Inquiry step 622 asks whether there are GLs for the selected purchase type and commodity code. If the response to the inquiry in step 622 is No, then the user enters a GL and in step 624, the CAM receives and validates the user's entry of the GL. Following step 624 or if the response to the inquiry in step 622 is Yes, the process continues with step 626.

Inquiry step 626 asks whether the item is eligible to be charged to a WIP and an expense account, but not a direct capital account. If the response to the inquiry in step 626 is Yes, then the process continues with step 646 of FIG. 6D; otherwise, the process continues with step 628.

Inquiry step 628 asks whether the item is eligible to be charged to a direct capital account. If the response to the inquiry in step 628 is Yes, then the process continues with step 634 of FIG. 6C; otherwise the process continues with process 630 that includes steps for charging the item to an expense, resale, balance sheet or inventory account, in accordance with the user's selection in step 620.

Figure 6C:
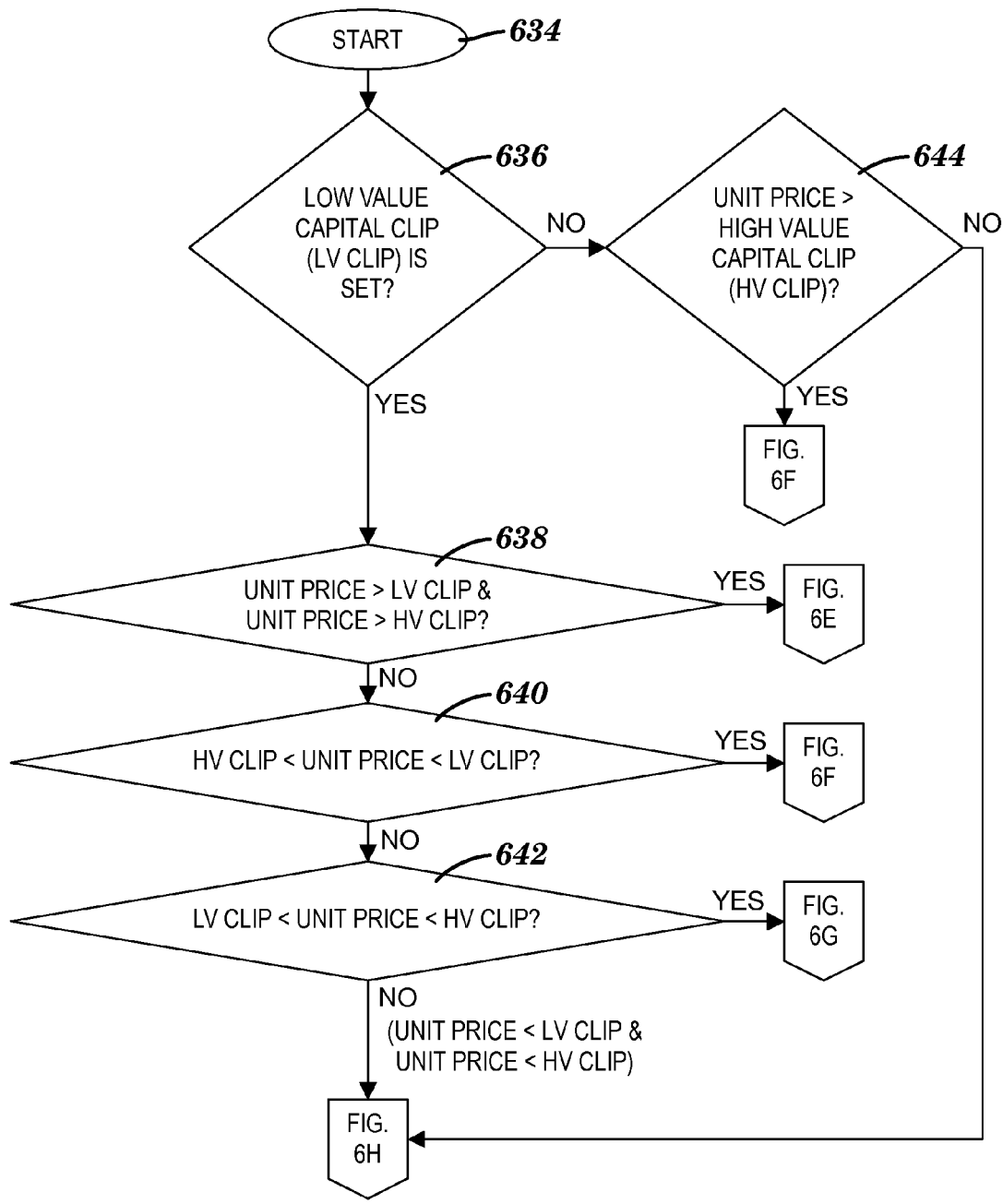

The portion of the process in FIG. 6C starts at step 634. Inquiry step 636 asks whether the low value capital clip level (LV clip) is set. If the response to the inquiry in step 636 is Yes, then the process continues with step 638.

Inquiry step 638 asks whether the unit price received in step 602 (see FIG. 6A) is greater than the LV clip and the unit price is greater than a high value capital clip level (HV clip). If the response to the inquiry in step 638 is Yes, then the process continues with step 654 of FIG. 6E; otherwise, the process continues with step 640. The Yes branch of step 638 corresponds to determining the AHAL rule in step 308 (see FIG. 3).

Inquiry step 640 asks whether the unit price received in step 602 (see FIG. 6A) is greater than the HV clip and the unit price is less than the LV clip. If the response to the inquiry in step 640 is Yes, then the process continues with step 668 of FIG. 6F; otherwise, the process continues with step 642. The Yes branch of step 640 corresponds to determining the AHBL rule in step 308 (see FIG. 3).

Inquiry step 642 asks whether the unit price received in step 602 (see FIG. 6A) is greater than the LV clip and less than the HV clip. If the response to the inquiry in step 642 is Yes, then the process continues with step 682 of FIG. 6G; otherwise, the unit price is less than the LV clip and the unit price is less than the HV clip, and the process continues with step 694 of FIG. 6H. The Yes branch of step 642 corresponds to determining the BHAL rule in step 308 (see FIG. 3). The No branch of step 642 corresponds to determining the BHBL rule in step 308 (see FIG. 3).

Returning to step 636, if the response to the inquiry in step 636 is No, then inquiry step 644 asks whether the unit price received in step 602 (see FIG. 6A) is greater than the HV clip. If the response to the inquiry in step 644 is Yes, then the process continues with step 668 of FIG. 6F; otherwise, the process continues with step 694 of FIG. 6H. The Yes branch of step 644 corresponds to determining the AHNL rule in step 308 (see FIG. 3). The No branch of step 644 corresponds to determining the BHNL rule in step 308 (see FIG. 3).

Figure 6D:
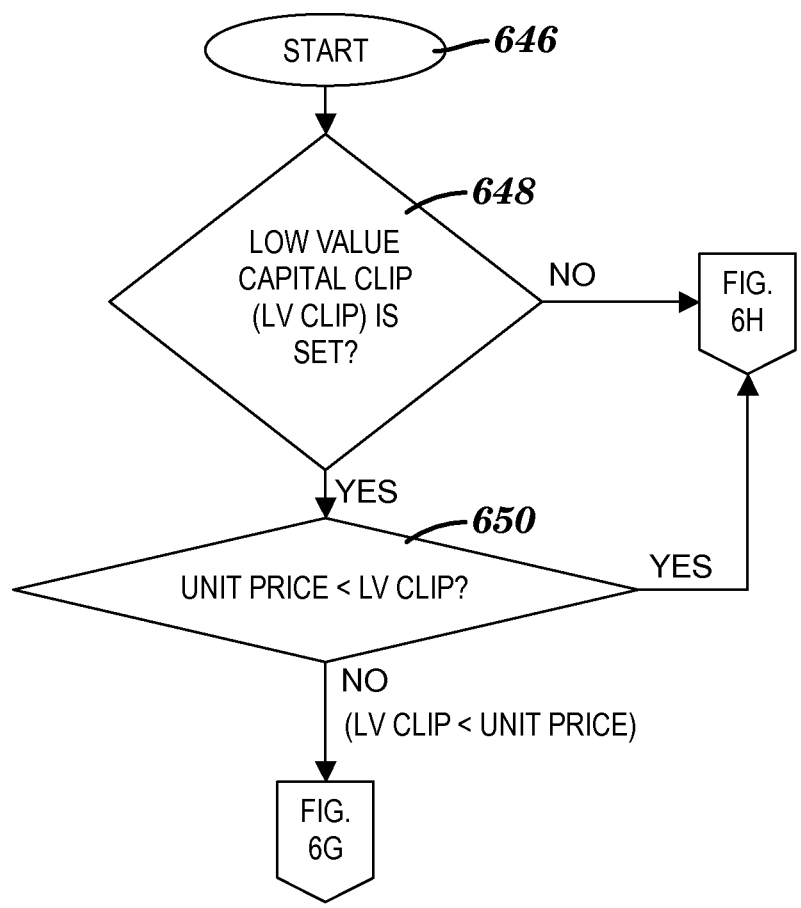

The portion of the process in FIG. 6D starts at step 646. Inquiry step 648 asks whether the LV clip is set. If the response to the inquiry in step 648 is Yes, then the process continues with step 650; otherwise the process continues with step 694 of FIG. 6H.

Inquiry step 650 asks whether the unit price received in step 602 (see FIG. 6A) is less than the LV clip. If the response to the inquiry in step 650 is Yes, then the process continues with step 694 of FIG. 6H; otherwise the process continues with step 682 of FIG. 6G.

Figure 6E:
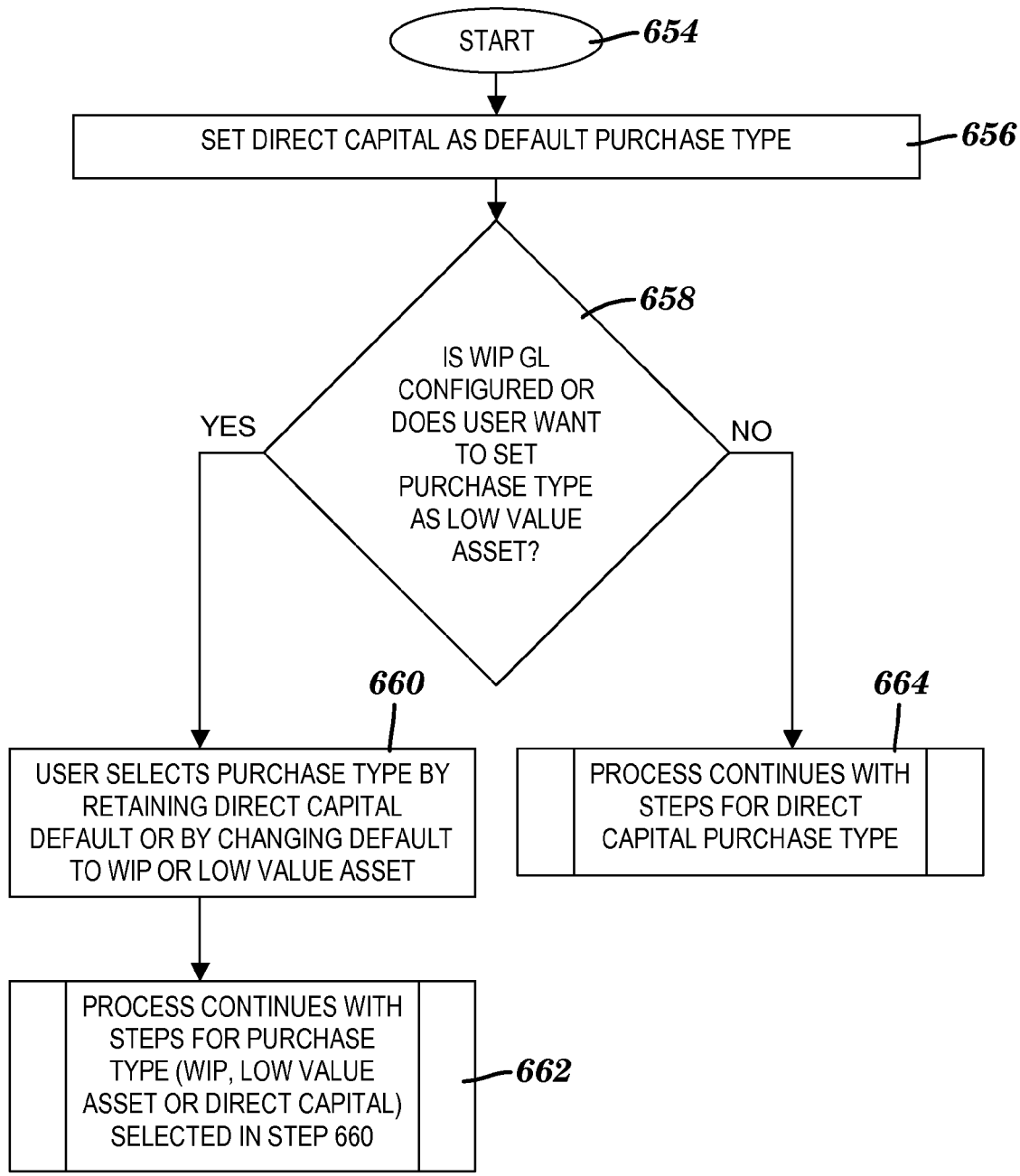

The portion of the process in FIG. 6E starts at step 654. In step 656, direct capital is set as the default purchase type. Inquiry step 658 asks whether a WIP GL account is configured or whether the user wants to set the purchase type as a low value asset. If the response to the inquiry in step 658 is Yes, then the process continues with step 660; otherwise, a process 664 is executed. Process 664 includes steps for charging the item to a direct capital account.

In step 660, the user selects a purchase type by retaining the default of the direct capital purchase type set in step 656 or by changing the default to WIP or low value asset. Following step 660 is a process 662, which includes steps for charging the item to the purchase type (i.e., direct capital, WIP or low value asset) selected in step 660.

Figure 6F:
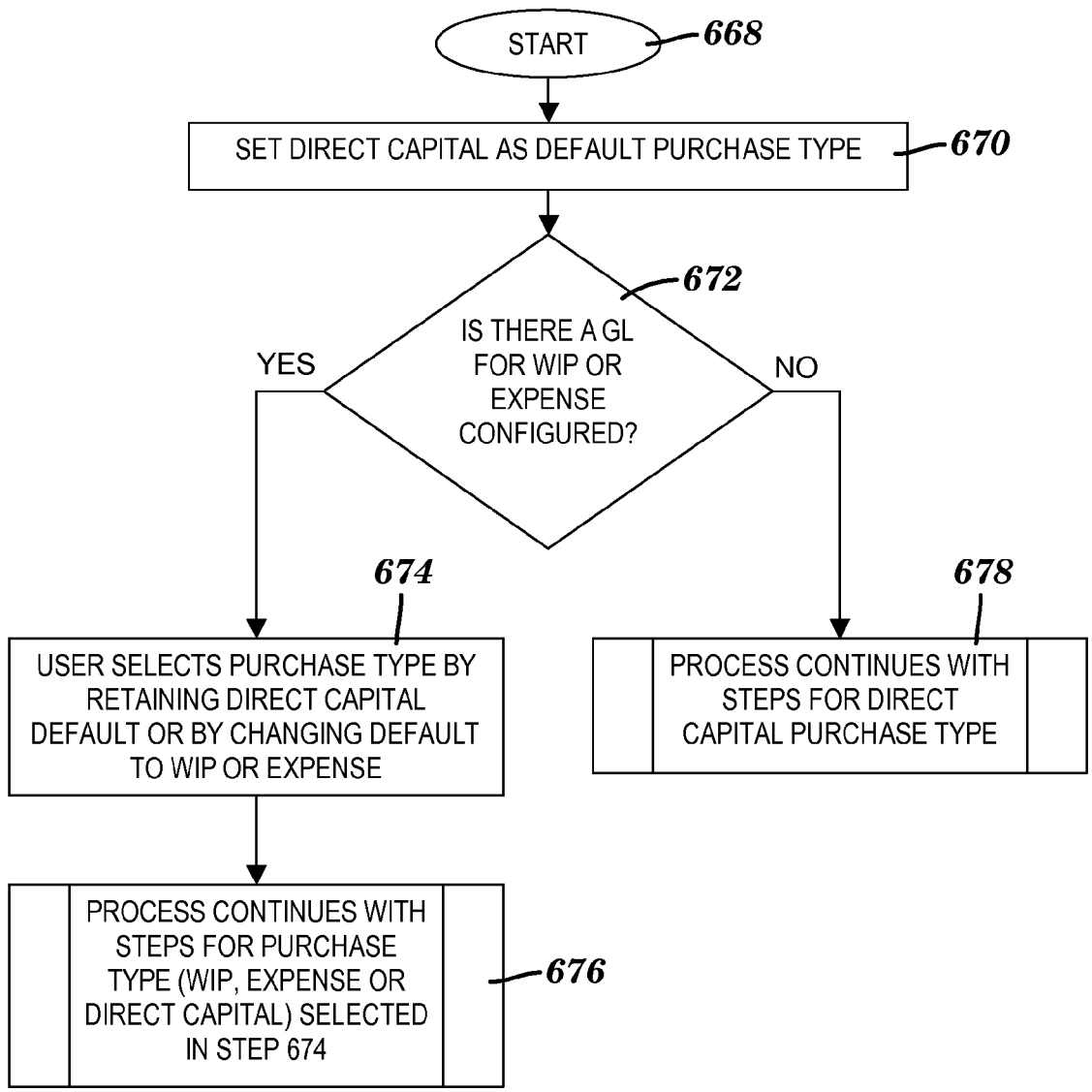

The portion of the process in FIG. 6F starts at step 668. In step 670, direct capital is set as the default purchase type. Inquiry step 672 asks whether a GL account is configured for WIP or expense. If the response to the inquiry in step 672 is Yes, then the process continues with step 674; otherwise, a process 678 is executed. Process 678 includes steps for charging the item to a direct capital account.

In step 674, the user selects a purchase type by retaining the default of the direct capital purchase type set in step 670 or by changing the default to WIP or expense. Following step 674 is a process 676, which includes steps for charging the item to the purchase type (i.e., direct capital, WIP or expense) selected in step 674.

Figure 6G:
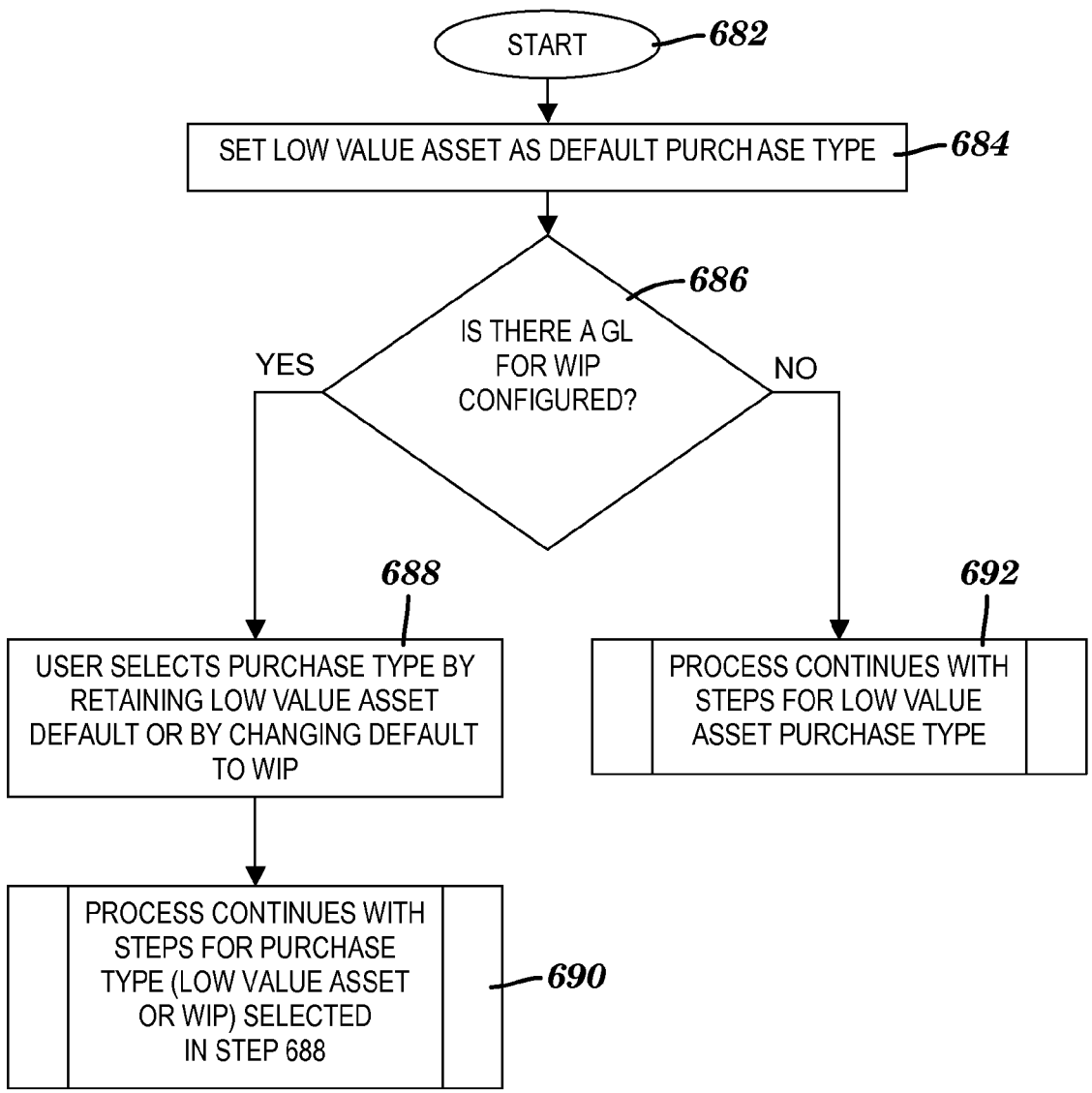

The portion of the process in FIG. 6G starts at step 682. In step 684, low value asset is set as the default purchase type. Inquiry step 686 asks whether a GL account is configured for WIP. If the response to the inquiry in step 686 is Yes, then the process continues with step 688; otherwise, a process 692 is executed. Process 692 includes steps for charging the item to a low value asset account.

In step 688, the user selects a purchase type by retaining the default of the low value asset purchase type set in step 684 or by changing the default to WIP. Following step 688 is a process 690, which includes steps for charging the item to the purchase type (i.e., WIP or low value asset) selected in step 688.

Figure 6H:
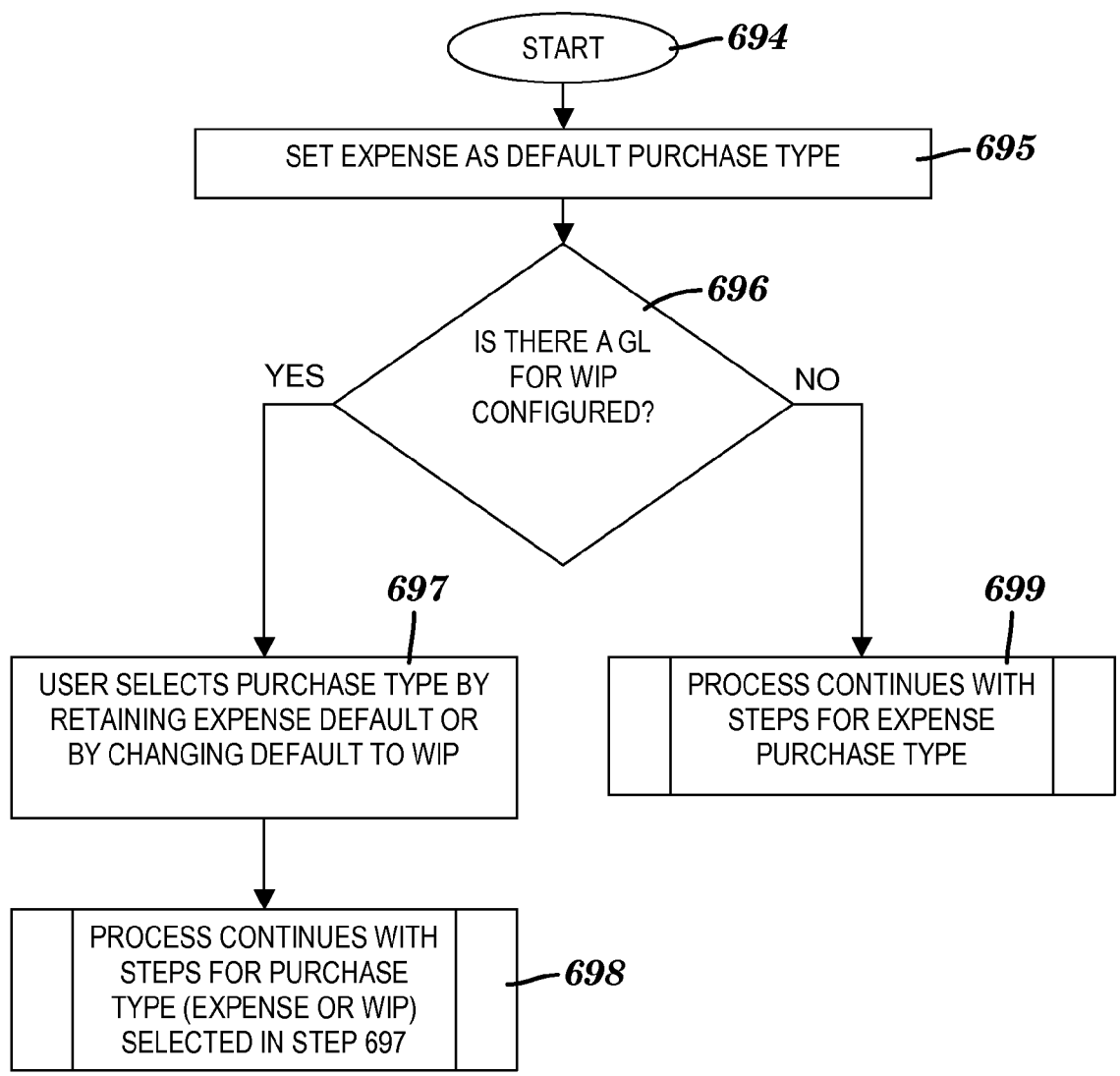

The portion of the process in FIG. 6H starts at step 694. In step 695, expense is set as the default purchase type. Inquiry step 696 asks whether a GL account is configured for WIP. If the response to the inquiry in step 696 is Yes, then the process continues with step 697; otherwise, a process 699 is executed. Process 699 includes steps for charging the item to an expense account.

In step 697, the user selects a purchase type by retaining the default of the expense purchase type set in step 695 or by changing the default to WIP. Following step 697 is a process 698, which includes steps for charging the item to the purchase type (i.e., WIP or expense) selected in step 697.

Computing System

Figure 7:
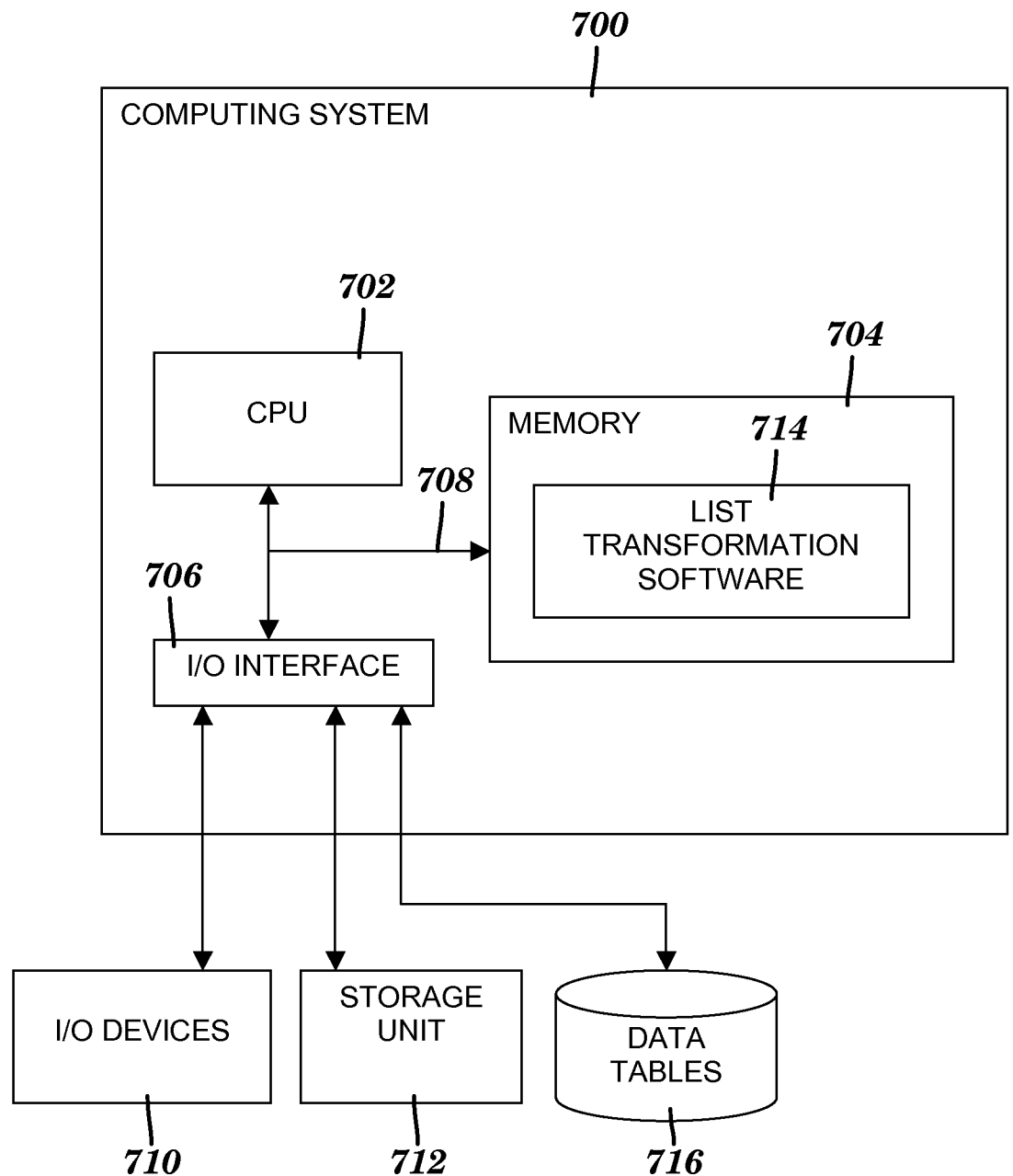
FIG. 7 is a block diagram of a computing system that is included in the system of FIG. 1 and that implements the process of FIG. 2, in accordance with embodiments of the present invention.

FIG. 7 is a block diagram of a computing system that is included in the system of FIG. 1 and that implements the process of FIG. 2, in accordance with embodiments of the present invention. In one embodiment, computing system 700 is an example of second computing system 104 (see FIG. 1). Computing system 700 generally comprises a central processing unit (CPU) 702, a memory 704, an input/output (I/O) interface 706, and a bus 708. I/O devices 710 and a computer data storage unit 712 are coupled to computing system 700. CPU 702 performs computation and control functions of computing system 700. CPU 702 may comprise a single processing unit, or be distributed across one or more processing units in one or more locations (e.g., on a client and server).

Memory 704 may comprise any known type of computer data storage and/or transmission media, including bulk storage, magnetic media, optical media, random access memory (RAM), read-only memory (ROM), a data cache, a data object, etc. In one embodiment, cache memory elements of memory 704 provide temporary storage of at least some program code in order to reduce the number of times code must be retrieved from bulk storage during execution. Moreover, similar to CPU 702, memory 704 may reside at a single physical location, comprising one or more types of data storage, or be distributed across a plurality of physical systems in various forms. Further, memory 704 can include data distributed across, for example, a local area network (LAN), wide area network (WAN) or storage area network (SAN).

I/O interface 706 comprises any system for exchanging information to or from an external source, including I/O devices 710, a computer data storage unit 712. I/O devices 710 comprise any known type of external device, including a display monitor, keyboard, mouse, printer, speakers, handheld device, printer, facsimile, etc. Bus 708 provides a communication link between each of the components in computing system 700, and may comprise any type of transmission link, including electrical, optical, wireless, etc.

I/O interface 706 also allows computing system 700 to store and retrieve information (e.g., program instructions or data) from an auxiliary storage device (e.g., computer data storage unit 712). The auxiliary storage device may be a non-volatile storage device, such as a hard disk drive or an optical disc drive (e.g., a CD-ROM drive which receives a CD-ROM disk). Computer data storage unit 712 is, for example, a magnetic disk drive (i.e., hard disk drive) or an optical disk drive.

Via retrieval of data from data tables 716 computing system 700 can transform a list (e.g., a starting list of purchase types) into a final selection list according to the processes disclosed herein. Data tables 716 include rule set trigger table 116 (see FIG. 1) and rule table 118 (see FIG. 1) and may be included in computer data storage unit 712 or another data repository coupled to computing system 700 via I/O interface 706. Data tables 716 and/or memory 704 may also store a user's selection of a value (e.g., purchase type) from the final selection list 120 (see FIG. 1).

Memory 704 includes computer program code (i.e., list transformation software 714) that provides the logic for the list transformation system disclosed herein. In one embodiment, list transformation software 714 is included in callee application 110 (see FIG. 1). Further, memory 704 may include other systems not shown in FIG. 7, such as an operating system (e.g., Linux) that runs on CPU 702 and provides control of various components within and/or connected to computing system 700.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software (e.g., list transformation software 714) and hardware aspects (e.g., computing system 700) that may all generally be referred to herein as a "system". Furthermore, the present invention may take the form of a computer program product embodied in any tangible medium of expression (e.g., memory 704) having computer-usable program code (e.g., software 714) embodied in the medium.

Any combination of one or more computer-usable or computer-readable medium(s) (e.g., memory 704) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code (e.g., software 714) for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer (e.g., computing system 700), partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (e.g., through the Internet using an Internet Service Provider).

The present invention is described herein with reference to flowchart illustrations (e.g., FIG. 2 and FIG. 3) and/or block diagrams of methods, apparatus (systems) (e.g., FIG. 1), and computer program products (see, e.g., FIG. 7) according to embodiments of the invention. It will be understood that each block of the flowchart illustrations and/or block diagrams, and combinations of blocks in the flowchart illustrations and/or block diagrams, can be implemented by computer program instructions (e.g., callee application 110 and calling application 108 of FIG. 1). These computer program instructions may be provided to a processor (e.g., CPU 702) of a general purpose computer (e.g., computing system 700), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 704) that can direct a computer (e.g., computing system 700) or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computing system 700 or second computing system 104 (see FIG. 1)) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of the present invention can be deployed, managed, serviced, etc. by a service provider that offers to deploy or integrate computing infrastructure with respect to the configurable rule-based method of transforming a starting list into a selection list. Thus, the present invention discloses a process for supporting computer infrastructure, comprising integrating, hosting, maintaining and deploying computer-readable code (e.g., software 714) into a computing system (e.g., computing system 700), wherein the code in combination with the computing system is capable of performing a configurable rule-based method of transforming a starting list into a selection list.

In another embodiment, the invention provides a business method that performs the process steps of the invention on a subscription, advertising and/or fee basis. That is, a service provider, such as a Solution Integrator, can offer to create, maintain, support, etc. a configurable rule-based method of transforming a starting list into a selection list. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code (e.g., software 714), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising:
   a central processing unit (CPU);
   a memory coupled to said CPU;
   a computer-readable, tangible storage device coupled to said CPU, said storage device containing instructions that when carried out by said CPU via said memory implement a method of transforming a starting list of purchase types into a selection list of valid purchase types by employing a configurable rule, said method comprising the steps of:
   receiving, by a software-based common accounting module (CAM) executing on said computer system, a plurality of parameters of an item whose purchase is being charged to an account by an execution by CAM of an accounting function of a plurality of accounting functions, wherein said plurality of parameters includes a unit price of said item and a commodity code that identifies said item;
   generating, by said CAM, a starting list that includes a set of purchase types, wherein said generating is based on a pre-defined category of said item, wherein each purchase type of said starting list specifies a corresponding accounting function of said plurality of accounting functions;

identifying, by said CAM and subsequent to said step of generating said starting list, a rule set of a plurality of rule sets stored in a rule set database table, wherein said rule set database table associates said rule set with one or more purchase types that specify one or more corresponding accounting functions of said plurality of accounting functions, wherein said identifying said rule set comprises determining that said one or more purchase types is a maximal subset of said set of purchase types included in said starting list;

identifying, by said CAM and subsequent to said step of identifying said rule set, a rule stored in a rule database table, wherein said identifying said rule is based on said rule set and based on said unit price; and applying said rule by said CAM and subsequent to said identifying said rule, wherein a result of said step of applying said rule is a selection list comprising a proper subset of said starting list.

2. The computer system of claim 1, wherein said method further comprises the step of:

determining, by said CAM, a relationship that includes a first comparison between said unit price and a first clip level and a second comparison between said unit price and a second clip level, wherein said relationship is selected from the group consisting of an AHAL relationship, a BHAL relationship, an AHBL relationship, a BHBL relationship, an AHNL relationship, and a BHNL relationship, wherein said AHAL relationship indicates that said unit price is greater than said first clip level and greater than said second clip level, wherein said BHAL relationship indicates that said unit price is less than said first clip level and greater than said second clip level, wherein said AHBL relationship indicates that said unit price is greater than said first clip level and less than said second clip level, wherein said BHBL relationship indicates that said unit price is less than said first clip level and less than said second clip level, wherein said AHNL relationship indicates that said unit price is greater than said first clip level and that said second clip level is not set to any value, and wherein said BHNL relationship indicates that said unit price is less than said first clip level and that said second clip level is not set to any value.

3. The computer system of claim 2, wherein said method further comprises the steps of:

said computer system determining said item has eligibility selected from the group consisting of a first eligibility to be charged to work-in-process (WIP), capital and expense accounts and a second eligibility to be charged to a direct capital account;

said computer system determining said second clip value is set;

said computer system determining said unit price is greater than said first clip level as said first comparison and said unit price is greater than said second clip level as said second comparison;

said computer system setting a direct capital as a default value of a purchase type of said item;

said computer system determining said WIP account is configured or receiving an indication that a user wants to set said purchase type as a low value asset; and said computer system receiving a selection of said purchase type by receiving a first selection of said direct capital as said default value of said purchase type or by receiving a second selection of a WIP or said low value asset as said purchase type instead of said default value of said purchase type, wherein said step of determining said relationship that includes said first and second comparisons includes determining said relationship is said AHAL relationship based on said unit price being greater than said first clip level and said unit price being greater than said second clip level.

4. The computer system of claim 2, wherein said method further comprises the steps of:

said computer system determining said item has eligibility selected from the group consisting of a first eligibility to be charged to work-in-process (WIP), capital and expense accounts and a second eligibility to be charged to a direct capital account;

said computer system determining said second clip value is set;

said computer system determining said unit price is less than said first clip level as said first comparison and said unit price is greater than said second clip level as said second comparison;

said computer system setting a low value asset as a default value of a purchase type of said item;

said computer system determining said WIP account is configured; and said computer system receiving a selection of said purchase type by receiving a first selection of said low value asset as said default value of said purchase type or by receiving a second selection of a WIP as said purchase type instead of said default value of said purchase type, wherein said step of determining said relationship that includes said first and second comparisons includes determining said relationship is said BHAL relationship based on said unit price being less than said first clip level and said unit price being greater than said second clip level.

5. The computer system of claim 2, wherein said method further comprises the steps of:

said computer system determining said item has eligibility selected from the group consisting of a first eligibility to be charged to work-in-process (WIP), capital and expense accounts and a second eligibility to be charged to a direct capital account;

said computer system determining said second clip value is set;

said computer system determining said unit price is greater than said first clip level as said first comparison and said unit price is less than said second clip level as said second comparison;

said computer system setting a direct capital as a default value of a purchase type of said item;

said computer system determining said WIP account or said expense account is configured; and said computer system receiving a selection of said purchase type by receiving a first selection of said direct capital as said default value of said purchase type or by receiving a second selection of a WIP or an expense as said purchase type instead of said default value of said purchase type, wherein said step of determining said relationship that includes said first and second comparisons includes determining said relationship is said AHBL relationship based on said unit price being greater than said first clip level and said unit price being less than said second clip level.

6. The computer system of claim 2, wherein said method further comprises the steps of:
said computer system determining said item has eligibility selected from the group consisting of a first eligibility to be charged to work-in-process (WIP), capital and expense accounts and a second eligibility to be charged to a direct capital account;
said computer system determining said second clip value is set;
said computer system determining said unit price is less than said first clip level as said first comparison and said unit price is less than said second clip level as said second comparison;
said computer system setting an expense as a default value of a purchase type of said item;
said computer system determining said WIP account is configured; and
said computer system receiving a selection of said purchase type by receiving a first selection of said expense as said default value of said purchase type or by receiving a second selection of a WIP as said purchase type instead of said default value of said purchase type,
wherein said step of determining said relationship that includes said first and second comparisons includes determining said relationship is said BHBL relationship based on said unit price being less than said first clip level and said unit price being less than said second clip level.

7. The computer system of claim 2, wherein said method further comprises the steps of:
said computer system determining said item has eligibility selected from the group consisting of a first eligibility to be charged to work-in-process (WIP), capital and expense accounts and a second eligibility to be charged to a direct capital account;
said computer system determining said second clip value is not set;
said computer system determining said unit price is greater than said first clip level as said first comparison;
said computer system setting a direct capital as a default value of a purchase type of said item;
said computer system determining said WIP account or said expense account is configured; and
said computer system receiving a selection of said purchase type by receiving a first selection of said direct capital as said default value of said purchase type or by receiving a second selection of a WIP or an expense as said purchase type instead of said default value of said purchase type,
wherein said step of determining said relationship that includes said first and second comparisons includes determining said relationship is said AHNL relationship based on said unit price being greater than said first clip level and said second clip level not being set.

8. The computer system of claim 2, wherein said method further comprises the steps of:
said computer system determining said item has eligibility selected from the group consisting of a first eligibility to be charged to work-in-process (WIP), capital and expense accounts and a second eligibility to be charged to a direct capital account;
said computer system determining said second clip value is not set;
said computer system determining said unit price is less than said first clip level as said first comparison;
said computer system setting an expense as a default value of a purchase type of said item;
said computer system determining said WIP account is configured; and
said computer system receiving a selection of said purchase type by receiving a first selection of said expense as said default value of said purchase type or by receiving a second selection of a WIP as said purchase type instead of said default value of said purchase type,
wherein said step of determining said relationship that includes said first and second comparisons includes determining said relationship is said BHNL relationship based on said unit price being less than said first clip level and said second clip level not being set.

9. The computer system of claim 2, wherein said method further comprises the step of identifying, by said CAM and in response to said step of determining said relationship, a rule code stored in said rule database table, wherein said rule code identifies said relationship.

10. The computer system of claim 9, wherein said step of identifying said rule code comprises identifying said rule code as being associated by said rule database table with said rule set.

11. A computer program product, comprising:
a computer-readable, tangible storage device; and
a computer-readable program code stored on the computer-readable, tangible storage device, said computer-readable program code containing instructions that, when executed by a processor of a computer system, implement a method of transforming a starting list of purchase types into a selection list of valid purchase types by employing a configurable rule, said method comprising the steps of:
receiving, by a software-based common accounting module (CAM) executing on the computer system, a plurality of parameters of an item whose purchase is being charged to an account by an execution by CAM of an accounting function of a plurality of accounting functions, wherein said plurality of parameters includes a unit price of said item and a commodity code that identifies said item;
generating, by said CAM, a starting list that includes a set of purchase types, wherein said generating is based on a pre-defined category of said item, wherein each purchase type of said starting list specifies a corresponding accounting function of said plurality of accounting functions;
identifying, by said CAM and subsequent to said step of generating said starting list, a rule set of a plurality of rule sets stored in a rule set database table, wherein said rule set database table associates said rule set with one or more purchase types that specify one or more corresponding accounting functions of said plurality of accounting functions, wherein said identifying said rule set comprises determining that said one or more purchase types is a maximal subset of said set of purchase types included in said starting list;
identifying, by said CAM and subsequent to said step of identifying said rule set, a rule stored in a rule database table, wherein said identifying said rule is based on said rule set and based on said unit price; and
applying said rule by said CAM and subsequent to said identifying said rule, wherein a result of said step of applying said rule is a selection list comprising a proper subset of said starting list.

12. The program product of claim 11, wherein said method further comprises the step of:
  determining, by said CAM, a relationship that includes a first comparison between said unit price and a first clip level and a second comparison between said unit price and a second clip level, wherein said relationship is selected from the group consisting of an AHAL relationship, a BHAL relationship, an AHBL relationship, a BHBL relationship, an AHNL relationship, and a BHNL relationship,
  wherein said AHAL relationship indicates that said unit price is greater than said first clip level and greater than said second clip level,
  wherein said BHAL relationship indicates that said unit price is less than said first clip level and greater than said second clip level,
  wherein said AHBL relationship indicates that said unit price is greater than said first clip level and less than said second clip level,
  wherein said BHBL relationship indicates that said unit price is less than said first clip level and less than said second clip level,
  wherein said AHNL relationship indicates that said unit price is greater than said first clip level and that said second clip level is not set to any value, and
  wherein said BHNL relationship indicates that said unit price is less than said first clip level and that said second clip level is not set to any value.

13. The program product of claim 12, wherein said method further comprises the steps of:
  said computer system determining said item has eligibility selected from the group consisting of a first eligibility to be charged to work-in-process (WIP), capital and expense accounts and a second eligibility to be charged to a direct capital account;
  said computer system determining said second clip value is set;
  said computer system determining said unit price is greater than said first clip level as said first comparison and said unit price is greater than said second clip level as said second comparison;
  said computer system setting a direct capital as a default value of a purchase type of said item;
  said computer system determining said WIP account is configured or receiving an indication that a user wants to set said purchase type as a low value asset; and
  said computer system receiving a selection of said purchase type by receiving a first selection of said direct capital as said default value of said purchase type or by receiving a second selection of a WIP or said low value asset as said purchase type instead of said default value of said purchase type,
  wherein said step of determining said relationship that includes said first and second comparisons includes determining said relationship is said AHAL relationship based on said unit price being greater than said first clip level and said unit price being greater than said second clip level.

14. The program product of claim 12, wherein said method further comprises the steps of:
  said computer system determining said item has eligibility selected from the group consisting of a first eligibility to be charged to work-in-process (WIP), capital and expense accounts and a second eligibility to be charged to a direct capital account;
  said computer system determining said second clip value is set;
  said computer system determining said unit price is less than said first clip level as said first comparison and said unit price is greater than said second clip level as said second comparison;
  said computer system setting a low value asset as a default value of a purchase type of said item;
  said computer system determining said WIP account is configured; and
  said computer system receiving a selection of said purchase type by receiving a first selection of said low value asset as said default value of said purchase type or by receiving a second selection of a WIP as said purchase type instead of said default value of said purchase type,
  wherein said step of determining said relationship that includes said first and second comparisons includes determining said relationship is said BHAL relationship based on said unit price being less than said first clip level and said unit price being greater than said second clip level.

15. The program product of claim 12, wherein said method further comprises the step of identifying, by said CAM and in response to said step of determining said relationship, a rule code stored in said rule database table, wherein said rule code identifies said relationship.

16. The program product of claim 15, wherein said step of identifying said rule code comprises identifying said rule code as being associated by said rule database table with said rule set.

17. A process for supporting computing infrastructure, said process comprising a first computer system providing at least one support service for at least one of creating, integrating, hosting, maintaining, and deploying computer-readable code in a second computer system, wherein the code in combination with the second computer system is capable of performing a method of transforming a starting list of purchase types into a selection list of valid purchase types by employing a configurable rule, said method comprising the steps of:
  receiving, by a software-based common accounting module (CAM) executing on the second computer system, a plurality of parameters of an item whose purchase is being charged to an account by an execution by CAM of an accounting function of a plurality of accounting functions, wherein said plurality of parameters includes a unit price of said item and a commodity code that identifies said item;
  generating, by said CAM, a starting list that includes a set of purchase types, wherein said generating is based on a pre-defined category of said item, wherein each purchase type of said starting list specifies a corresponding accounting function of said plurality of accounting functions;
  identifying, by said CAM and subsequent to said step of generating said starting list, a rule set of a plurality of rule sets stored in a rule set database table, wherein said rule set database table associates said rule set with one or more purchase types that specify one or more corresponding accounting functions of said plurality of accounting functions, wherein said identifying said rule set comprises determining that said one or more purchase types is a maximal subset of said set of purchase types included in said starting list;
  identifying, by said CAM and subsequent to said step of identifying said rule set, a rule stored in a rule database table, wherein said identifying said rule is based on said rule set and based on said unit price; and applying said rule by said CAM and subsequent to said identifying said rule, wherein a result of said step of applying said rule is a selection list comprising a proper subset of said starting list.

18. The process of claim 17, wherein said method further comprises the step of:

determining, by said CAM, a relationship that includes a first comparison between said unit price and a first clip level and a second comparison between said unit price and a second clip level, wherein said relationship is selected from the group consisting of an AHAL relationship, a BHAL relationship, an AHBL relationship, a BHBL relationship, an AHNL relationship, and a BHNL relationship, wherein said AHAL relationship indicates that said unit price is greater than said first clip level and greater than said second clip level, wherein said BHAL relationship indicates that said unit price is less than said first clip level and greater than said second clip level, wherein said AHBL relationship indicates that said unit price is greater than said first clip level and less than said second clip level, wherein said BHBL relationship indicates that said unit price is less than said first clip level and less than said second clip level, wherein said AHNL relationship indicates that said unit price is greater than said first clip level and that said second clip level is not set to any value, and wherein said BHNL relationship indicates that said unit price is less than said first clip level and that said second clip level is not set to any value.

19. The process of claim 18, wherein said method further comprises the step of identifying, by said CAM and in response to said step of determining said relationship, a rule code stored in said rule database table, wherein said rule code identifies said relationship.

20. The process of claim 19, wherein said step of identifying said rule code comprises identifying said rule code as being associated by said rule database table with said rule set.

* * * * *